US012670254B2

(12) United States Patent
Tanaka et al.

(10) Patent No.: US 12,670,254 B2
(45) Date of Patent: Jun. 30, 2026

(54) STORAGE ACCESS MONITORING METHOD AND STORAGE ACCESS MONITORING DEVICE

(71) Applicant: HITACHI SYSTEMS, LTD., Tokyo (JP)

(72) Inventors: Satoshi Tanaka, Tokyo (JP); Shotaro Ohno, Tokyo (JP); Kaoru Yamane, Tokyo (JP); Shoko Umemura, Tokyo (JP); Masahiko Wakatsuki, Tokyo (JP)

(73) Assignee: Hitachi Systems, Ltd., Tokyo (JP)

( * ) Notice: Subject to any disclaimer, the term of this patent is extended or adjusted under 35 U.S.C. 154(b) by 116 days.

(21) Appl. No.: 18/645,125

(22) Filed: Apr. 24, 2024

(65) Prior Publication Data

US 2025/0335590 A1 Oct. 30, 2025

(51) Int. Cl.
*G06F 21/56* (2013.01)
*G06F 21/55* (2013.01)

(52) U.S. Cl.
CPC .......... *G06F 21/566* (2013.01); *G06F 21/554* (2013.01)

(58) Field of Classification Search
None
See application file for complete search history.

(56) References Cited

U.S. PATENT DOCUMENTS

| | | | | |
|---|---|---|---|---|
| 10,503,904 | B1 * | 12/2019 | Singh | .................... G06F 21/566 |
| 2018/0020013 | A1 * | 1/2018 | Yoshikawa | ............. G06F 21/56 |

| | | | | |
|---|---|---|---|---|
| 2018/0322281 | A1 | 11/2018 | Borlick et al. | |
| 2019/0121978 | A1 * | 4/2019 | Kraemer | ................ G06F 21/565 |
| 2020/0097653 | A1 * | 3/2020 | Mehta | .................... G06F 21/56 |
| 2020/0342104 | A1 * | 10/2020 | Palisse | .................. G06F 21/566 |
| 2021/0216648 | A1 * | 7/2021 | Child | .................... G06F 21/604 |
| 2021/0271757 | A1 * | 9/2021 | Horspool | ............. H04L 63/1416 |
| 2021/0397711 | A1 * | 12/2021 | Karr | ........................ G06F 21/78 |
| 2023/0023584 | A1 * | 1/2023 | Sternfeld | ............... G06F 21/566 |
| 2023/0229773 | A1 * | 7/2023 | Madden, Jr. | ......... G06F 21/554 |
| | | | | 726/23 |

(Continued)

FOREIGN PATENT DOCUMENTS

| | | | |
|---|---|---|---|
| EP | 4258145 A1 | 10/2023 | |
| WO | WO 2019/073720 A1 | 4/2019 | |

*Primary Examiner* — Christopher C Harris
(74) *Attorney, Agent, or Firm* — Knobbe, Martens, Olson & Bear, LLP

(57) ABSTRACT

A storage access monitoring method according to the present invention acquires the operation status of a volume 40 constituting a storage device 30 from which an endpoint (host 10) can read/write data through a network 50 as operation information, and determines whether or not a behavior related to the latest operation information is abnormal by performing any one or more of a comparative analysis step, a pattern comparison step, or a trend comparison step. The comparative analysis step includes comparing the latest operation information with past operation information. The pattern comparison step includes determining whether or not there is a behavioral pattern that indicates a possibility of an effect of the ransomware in the latest operation information. The trend comparison step includes determining whether or not an operation related to the latest operation information is different from a normal operation related to the past operation information.

9 Claims, 14 Drawing Sheets

(56)                    References Cited

U.S. PATENT DOCUMENTS

2024/0256171 A1*    8/2024  Dar ........................ G06F 3/0659
2024/0370166 A1*  11/2024  Dar ......................... G06F 3/061
2025/0173437 A1*    5/2025  Gupta .................... G06N 20/00
2025/0217483 A1*    7/2025  Metin ................... G06F 21/554

* cited by examiner

Figure 3:
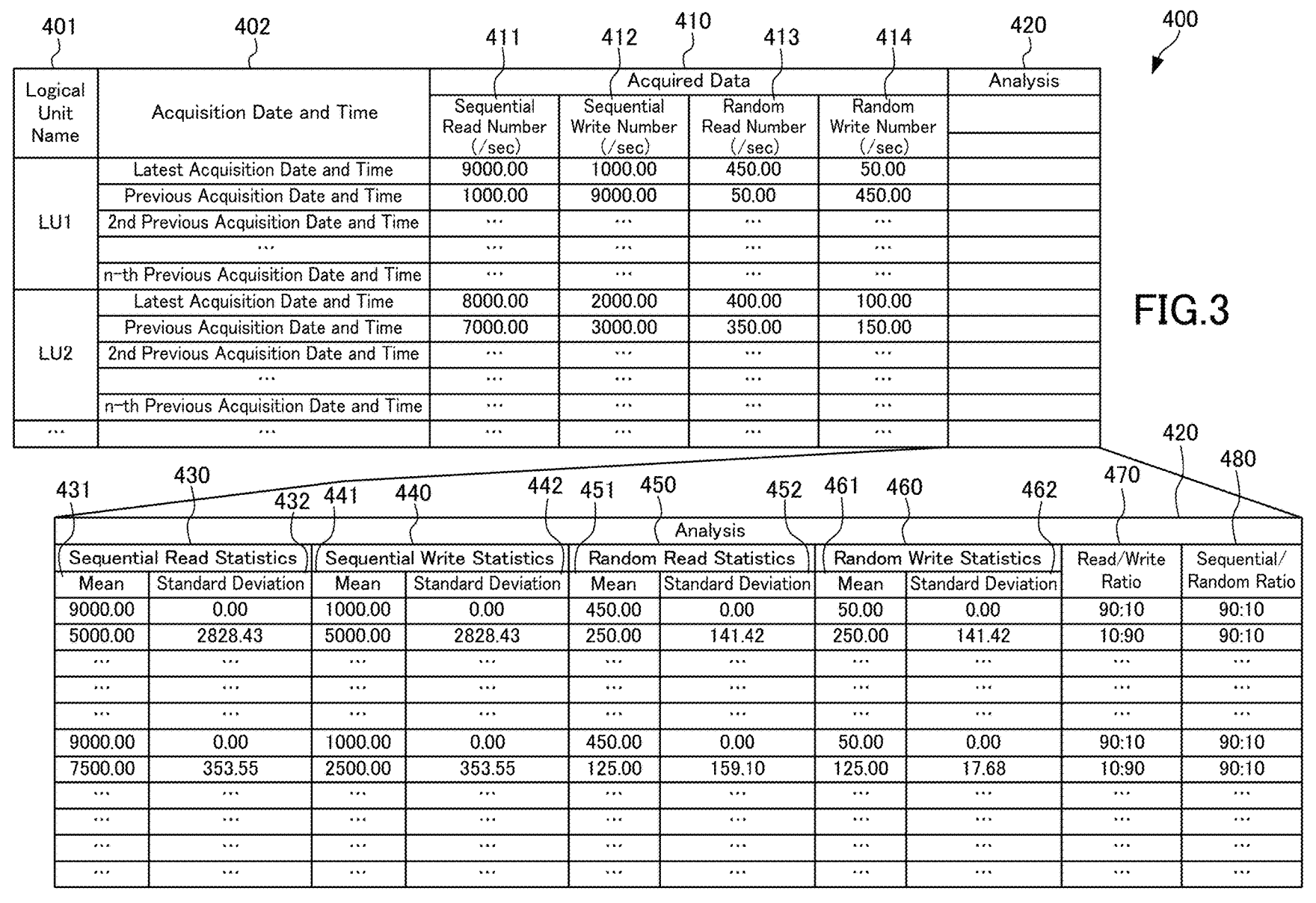

400

| Logical Unit Name | Acquisition Date and Time | Acquired Data | | | | Analysis |
|---|---|---|---|---|---|---|
| | | Sequential Read Number (/sec) | Sequential Write Number (/sec) | Random Read Number (/sec) | Random Write Number (/sec) | |
| LU1 | Latest Acquisition Date and Time | 9000.00 | 1000.00 | 450.00 | 50.00 | |
| | Previous Acquisition Date and Time | 1000.00 | 9000.00 | 50.00 | 450.00 | |
| | 2nd Previous Acquisition Date and Time | ... | ... | ... | ... | |
| | ... | | | | | |
| | n-th Previous Acquisition Date and Time | | | | | |
| LU2 | Latest Acquisition Date and Time | 8000.00 | 2000.00 | 400.00 | 100.00 | |
| | Previous Acquisition Date and Time | 7000.00 | 3000.00 | 350.00 | 150.00 | |
| | 2nd Previous Acquisition Date and Time | ... | ... | ... | ... | |
| | ... | | | | | |
| | n-th Previous Acquisition Date and Time | | | | | |
| ... | | | | | | |

401 402 410 411 412 413 414 420

Analysis — 420

| Sequential Read Statistics | | Sequential Write Statistics | | Random Read Statistics | | Random Write Statistics | | Read/Write Ratio | Sequential/Random Ratio |
|---|---|---|---|---|---|---|---|---|---|
| Mean | Standard Deviation | Mean | Standard Deviation | Mean | Standard Deviation | Mean | Standard Deviation | | |
| 9000.00 | 0.00 | 1000.00 | 0.00 | 450.00 | 0.00 | 50.00 | 0.00 | 90:10 | 90:10 |
| 5000.00 | 2828.43 | 5000.00 | 2828.43 | 250.00 | 141.42 | 250.00 | 141.42 | 10:90 | 90:10 |
| ... | ... | ... | ... | ... | ... | ... | ... | ... | ... |
| ... | ... | ... | ... | ... | ... | ... | ... | ... | ... |
| 9000.00 | 0.00 | 1000.00 | 0.00 | 450.00 | 0.00 | 50.00 | 0.00 | 90:10 | 90:10 |
| 7500.00 | 353.55 | 2500.00 | 353.55 | 125.00 | 159.10 | 125.00 | 17.68 | 10:90 | 90:10 |
| ... | ... | ... | ... | ... | ... | ... | ... | ... | ... |
| ... | ... | ... | ... | ... | ... | ... | ... | ... | ... |

| Logical Unit Name (501) | File Name (502) | LBA Flag (503) | Block Address (504) | Acquisition Date and Time (505) | Acquired Data (510) | | | |
|---|---|---|---|---|---|---|---|---|
| | | | | | Sequential Read Number (/sec) (511) | Sequential Write Number (/sec) (512) | Random Read Number (/sec) (513) | Random Write Number (/sec) (514) |
| LU1 | AAAA | Y | LU1 : XXXX | Latest Acquisition Date and Time | 900 | 100 | 45 | 5 |
| | | | | Previous Acquisition Date and Time | 100 | 900 | 45 | 5 |
| | | | | 2nd Previous Acquisition Date and Time | 600 | 400 | 30 | 20 |
| | | | | ... | ... | ... | ... | ... |
| | | | | n-th Previous Acquisition Date and Time | | | | |
| | AAAA | N | LU1 : YYYY | Latest Acquisition Date and Time | 800 | 200 | 40 | 10 |
| | | | | Previous Acquisition Date and Time | 700 | 300 | 40 | 10 |
| | | | | 2nd Previous Acquisition Date and Time | 750 | 250 | 25 | 25 |
| | | | | ... | ... | ... | ... | ... |
| | | | | n-th Previous Acquisition Date and Time | | | | |
| LU2 | BBBB | Y | LU2 : ABCD | Latest Acquisition Date and Time | 300 | 200 | 20 | 30 |
| | | | | Previous Acquisition Date and Time | 100 | 400 | 30 | 20 |
| | | | | 2nd Previous Acquisition Date and Time | 200 | 300 | 30 | 20 |
| | | | | ... | ... | ... | ... | ... |
| | | | | n-th Previous Acquisition Date and Time | | | | |
| | BBBB | N | LU2 : EFGH | Latest Acquisition Date and Time | 250 | 250 | 20 | 30 |
| | | | | Previous Acquisition Date and Time | 100 | 400 | 30 | 20 |
| | | | | 2nd Previous Acquisition Date and Time | 100 | 400 | 30 | 20 |
| | | | | ... | ... | ... | ... | ... |
| | | | | n-th Previous Acquisition Date and Time | | | | |
| ... | ... | ... | ... | | | | | |

| Logical Unit Name | Acquisition Date and Time | Acquired Data | | | | Analysis |
|---|---|---|---|---|---|---|
| 401 | 402 | Sequential Read Number (/sec) 411 | Sequential Write Number (/sec) 412 | Random Read Number (/sec) 413 | Random Write Number (/sec) 414 | 420 |
| LU1 | Latest Acquisition Date and Time | 9000.00 | 1000.00 | 450.00 | 50.00 | R1 |
| | Previous Acquisition Date and Time | 1000.00 | 9000.00 | 50.00 | 450.00 | |
| | 2nd Previous Acquisition Date and Time | ... | ... | ... | ... | |
| | ... | | | | | |
| | n-th Previous Acquisition Date and Time | | | | | |
| LU2 | Latest Acquisition Date and Time | 8000.00 | 2000.00 | 400.00 | 100.00 | R1 |
| | Previous Acquisition Date and Time | 7000.00 | 3000.00 | 350.00 | 150.00 | |
| | 2nd Previous Acquisition Date and Time | ... | ... | ... | ... | |
| | ... | | | | | |
| | n-th Previous Acquisition Date and Time | | | | | |
| ... | | | | | | |

420

Analysis

| Sequential Read Statistics 430 | | Sequential Write Statistics 440 | | Random Read Statistics 450 | | Random Write Statistics 460 | | Read/Write Ratio 470 | Sequential/Random Ratio 480 |
|---|---|---|---|---|---|---|---|---|---|
| Mean 431 | Standard Deviation 432 | Mean 441 | Standard Deviation 442 | Mean 451 | Standard Deviation 452 | Mean 461 | Standard Deviation 462 | | |
| 9000.00 | 0.00 | 1000.00 | 0.00 | 450.00 | 0.00 | 50.00 | 0.00 | 90:10 | 90:10 |
| 5000.00 | 2828.43 | 5000.00 | 2828.43 | 250.00 | 141.42 | 250.00 | 141.42 | 10:90 | 90:10 |
| ... | ... | ... | ... | ... | ... | ... | ... | ... | ... |
| ... | ... | ... | ... | ... | ... | ... | ... | ... | ... |
| 9000.00 | 0.00 | 1000.00 | 0.00 | 450.00 | 0.00 | 50.00 | 0.00 | 90:10 | 90:10 |
| 7500.00 | 353.55 | 2500.00 | 353.55 | 125.00 | 159.10 | 125.00 | 17.68 | 10:90 | 90:10 |
| ... | ... | ... | ... | ... | ... | ... | ... | ... | ... |
| ... | ... | ... | ... | ... | ... | ... | ... | ... | ... |

| Logical Unit Name (501) | File Name (502) | LBA Flag (503) | Block Address (504) | Acquisition Date and Time (505) | Acquired Data (510) | | | |
|---|---|---|---|---|---|---|---|---|
| | | | | | Sequential Read Number (/sec) (511) | Sequential Write Number (/sec) (512) | Random Read Number (/sec) (513) | Random Write Number (/sec) (514) |
| LU1 | AAAA | Y | LU1 : XXXX | Latest Acquisition Date and Time | 900 | 100 | 45 | 5 (R2) |
| | | | | Previous Acquisition Date and Time | 100 | 900 | 45 | 5 |
| | | | | 2nd Previous Acquisition Date and Time | 600 | 400 | 30 | 20 |
| | | | | ... | ... | ... | ... | ... |
| | | | | n-th Previous Acquisition Date and Time | | | | |
| | AAAA | N | LU1 : YYYY | Latest Acquisition Date and Time | 800 | 200 | 40 | 10 (R2) |
| | | | | Previous Acquisition Date and Time | 700 | 300 | 40 | 10 |
| | | | | 2nd Previous Acquisition Date and Time | 750 | 250 | 25 | 25 |
| | | | | ... | ... | ... | ... | ... |
| | | | | n-th Previous Acquisition Date and Time | | | | |
| LU2 | BBBB | Y | LU2 : ABCD | Latest Acquisition Date and Time | 300 | 200 | 20 | 30 (R2) |
| | | | | Previous Acquisition Date and Time | 100 | 400 | 30 | 20 |
| | | | | 2nd Previous Acquisition Date and Time | 200 | 300 | 30 | 20 |
| | | | | ... | ... | ... | ... | ... |
| | | | | n-th Previous Acquisition Date and Time | | | | |
| | BBBB | N | LU2 : EFGH | Latest Acquisition Date and Time | 250 | 250 | 20 | 30 (R2) |
| | | | | Previous Acquisition Date and Time | 100 | 400 | 30 | 20 |
| | | | | 2nd Previous Acquisition Date and Time | 100 | 400 | 30 | 20 |
| | | | | ... | ... | ... | ... | ... |
| | | | | n-th Previous Acquisition Date and Time | | | | |
| ... | ... | ... | ... | | | | | |

| Logical Unit Name | File Name | LBA Flag | Block Address | Acquisition Date and Time | Acquired Data | | | |
|---|---|---|---|---|---|---|---|---|
| 501 | 502 | 503 | 504 | 505 | Sequential Read Number (/sec) 511 | Sequential Write Number (/sec) 512 | Random Read Number (/sec) 513 | Random Write Number (/sec) 514 |
| | | | | | | | 510 | |
| LU1 | AAAA | Y | LU1 : XXXX | Latest Acquisition Date and Time | 900 | 100 | 45 | 5 |
| | | | | Previous Acquisition Date and Time | 100 | 900 | 45 | 5 |
| | | | | 2nd Previous Acquisition Date and Time | 600 | 400 | 30 | 20 |
| | | | | ... | ... | ... | ... | ... |
| | | | | n-th Previous Acquisition Date and Time | | | | |
| | AAAA | N | LU1 : YYYY | Latest Acquisition Date and Time | 800 | 200 | 40 | 10 |
| | | | | Previous Acquisition Date and Time | 700 | 300 | 40 | 10 |
| | | | | 2nd Previous Acquisition Date and Time | 750 | 250 | 25 | 25 |
| | | | | ... | ... | ... | ... | ... |
| | | | | n-th Previous Acquisition Date and Time | | | | |
| LU2 | BBBB | Y | LU2 : ABCD | Latest Acquisition Date and Time | 300 | 200 | 20 | 30 |
| | | | | Previous Acquisition Date and Time | 100 | 400 | 30 | 20 |
| | | | | 2nd Previous Acquisition Date and Time | 200 | 300 | 30 | 20 |
| | | | | ... | ... | ... | ... | ... |
| | | | | n-th Previous Acquisition Date and Time | | | | |
| | BBBB | N | LU2 : EFGH | Latest Acquisition Date and Time | 250 | 250 | 20 | 30 |
| | | | | Previous Acquisition Date and Time | 100 | 400 | 30 | 20 |
| | | | | 2nd Previous Acquisition Date and Time | 100 | 400 | 30 | 20 |
| | | | | ... | ... | ... | ... | ... |
| | | | | n-th Previous Acquisition Date and Time | | | | |
| ... | ... | ... | ... | | ... | ... | ... | ... |

| Logical Unit Name (401) | Acquisition Date and Time (402) | Acquired Data (410) | | | | Analysis (420) |
|---|---|---|---|---|---|---|
| | | Sequential Read Number (/sec) (411) | Sequential Write Number (/sec) (412) | Random Read Number (/sec) (413) | Random Write Number (/sec) (414) | |
| LU1 | Latest Acquisition Date and Time | 9000.00 | 1000.00 | 450.00 | 50.00 | |
| | Previous Acquisition Date and Time | 1000.00 | 9000.00 | 50.00 | 450.00 | |
| | 2nd Previous Acquisition Date and Time | ... | ... | ... | ... | |
| | ... | | | | | |
| | n-th Previous Acquisition Date and Time | | | | | |
| LU2 | Latest Acquisition Date and Time | 8000.00 | 2000.00 | 400.00 | 100.00 | |
| | Previous Acquisition Date and Time | 7000.00 | 3000.00 | 350.00 | 150.00 | |
| | 2nd Previous Acquisition Date and Time | ... | ... | ... | ... | |
| | ... | | | | | |
| | n-th Previous Acquisition Date and Time | ... | ... | ... | ... | |
| ... | | | | | | |

420 Analysis

| Sequential Read Statistics (430) | | Sequential Write Statistics (440) | | Random Read Statistics (450) | | Random Write Statistics (460) | | Read/Write Ratio (470) | Sequential/ Random Ratio (480) |
|---|---|---|---|---|---|---|---|---|---|
| Mean (431) | Standard Deviation (432) | Mean (441) | Standard Deviation (442) | Mean (451) | Standard Deviation (452) | Mean (461) | Standard Deviation (462) | | |
| 9000.00 | 0.00 | 1000.00 | 0.00 | 450.00 | 0.00 | 50.00 | 0.00 | 90:10 | 90:10 |
| 5000.00 | 2828.43 | 5000.00 | 2828.43 | 250.00 | 141.42 | 250.00 | 141.42 | 10:90 | 90:10 |
| ... | ... | ... | ... | ... | ... | ... | ... | ... | ... |
| 9000.00 | 0.00 | 1000.00 | 0.00 | 450.00 | 0.00 | 50.00 | 0.00 | 90:10 | 90:10 |
| 7500.00 | 353.55 | 2500.00 | 353.55 | 125.00 | 159.10 | 125.00 | 17.68 | 10:90 | 90:10 |
| ... | ... | ... | ... | ... | ... | ... | ... | ... | ... |

| Logical Unit Name (501) | File Name (502) | LBA Flag (503) | Block Address (504) | Acquisition Date and Time (505) | Acquired Data (510) | | | |
|---|---|---|---|---|---|---|---|---|
| | | | | | Sequential Read Number (/sec) (511) | Sequential Write Number (/sec) (512) | Random Read Number (/sec) (513) | Random Write Number (/sec) (514) |
| LU1 | AAAA | Y | LU1 : XXXX | Latest Acquisition Date and Time | 900 | 100 | 45 | 5 |
| | | | | Previous Acquisition Date and Time | 100 | 900 | 45 | 5 |
| | | | | 2nd Previous Acquisition Date and Time | 600 | 400 | 30 | 20 |
| | | | | n-th Previous Acquisition Date and Time | ... | ... | ... | ... |
| | AAAA | N | LU1 : YYYY | Latest Acquisition Date and Time | 800 | 200 | 40 | 10 |
| | | | | Previous Acquisition Date and Time | 700 | 300 | 40 | 10 |
| | | | | 2nd Previous Acquisition Date and Time | 750 | 250 | 25 | 25 |
| | | | | n-th Previous Acquisition Date and Time | ... | ... | ... | ... |
| LU2 | BBBB | Y | LU2 : ABCD | Latest Acquisition Date and Time | 300 | 200 | 20 | 30 |
| | | | | Previous Acquisition Date and Time | 100 | 400 | 30 | 20 |
| | | | | 2nd Previous Acquisition Date and Time | 200 | 300 | 30 | 20 |
| | | | | n-th Previous Acquisition Date and Time | ... | ... | ... | ... |
| | BBBB | N | LU2 : EFGH | Latest Acquisition Date and Time | 250 | 250 | 20 | 30 |
| | | | | Previous Acquisition Date and Time | 100 | 400 | 30 | 20 |
| | | | | 2nd Previous Acquisition Date and Time | 100 | 400 | 30 | 20 |
| | | | | n-th Previous Acquisition Date and Time | ... | ... | ... | ... |
| ... | ... | ... | ... | | | | | |

R7  R8  R7

STORAGE ACCESS MONITORING METHOD AND STORAGE ACCESS MONITORING DEVICE

FIELD OF THE INVENTION

The present invention relates to a storage access monitoring method and a storage access monitoring device, particularly to a storage access monitoring method and a storage access monitoring device that make it possible to detect an abnormal behavior in storage access caused by ransomware.

BACKGROUND ART

Ransomware is known as one of the methods for cyber-attacks that have been rapidly increasing in recent years. Ransomware is a malware that infiltrates a system and arbitrarily encrypts or exfiltrates data. Data encrypted by ransomware becomes unusable and ransom may be demanded for decryption in some cases. Further, in some cases, public disclosure of the data exfiltrated by ransomware may be threatened. Therefore, it is important to strengthen the security to prevent ransomware attacks, and to find ransomware attacks at an early stage before the data is encrypted or exfiltrated on a large scale in the unlikely event of ransomware infection.

Conventionally, timings of detecting ransomware attacks include detection by user, detection by security software, or detection by security operation centers (SOCs) etc. However, in the above-mentioned conventional timings, the detection of the ransomware attack is delayed, and thus it takes time to initiate any action to deal with the attack, leading to the risk of the damage spreading.

A common method of dealing with the ransomware attack is to recover from backup data. However, identifying the data at the time point before infection by the ransomware among multiple backup data requires retroactively validating data along timeline, which may be time-consuming.

In the case that it is too late to realize that data has been encrypted by ransomware, there may be such situations that no backup data exists that has not been infected, so that the recovery may require enormous amount of time and effort, sometimes even making it impossible to recover data.

As the first conventional countermeasure against the ransomware, there is known the use of endpoint virus checking software, such as a virus checking function installed on a personal computer (PC). In this first counter-measure, the endpoint virus checking software can detect and remove ransomware infiltration and prevent data encryption due to the ransomware infiltration and attack in advance.

As the second conventional countermeasure against the ransomware, there is known a method of storing backup data in a location (Vault area) that is inaccessible from external sources to protect data from encryption and exfiltration by ransomware even in the event of incident. This second countermeasure has been adopted by many storage vendors.

As the third conventional countermeasure against the ransomware, the technology disclosed in the following Patent Document 1 is known. Patent Document 1 discloses a ransomware detection method executed by a computer. The ransomware detection method disclosed in Patent Document 1 periodically monitors a file access log, and if the frequency of file accesses typically performed by ransomware exceeds a predetermined threshold among records for which file access is permitted, a determination is made that there is a possibility of ransomware attack, and countermeasures are taken. Countermeasures include sending a command to the file access control means to block file access.

PRIOR ART DOCUMENTS

Patent Document

[PATENT DOCUMENT 1] International Publication No. 2019/073720

SUMMARY OF THE INVENTION

Problem to be Solved by the Invention

However, the virus checking software used in the above-mentioned first countermeasure detects patterns that exhibit the characteristics of viruses and ransomware. Therefore, there is such a problem in that, while it is effective against known ransomware, it cannot detect ransomware with patterns exhibiting unknown characteristics, and thus cannot prevent ransomware attacks.

The above-mentioned first countermeasure also requires that virus checking software be running on all endpoints connected to the network. Therefore, there is such a problem that if there are endpoints that do not have virus checking software running or have not been properly updated with the latest pattern files, even known ransomware would be able to infiltrate and launch attacks.

In the method of storing backup data in the Vault area as in the above-mentioned second countermeasure, if the data before storing in the Vault area has already been encrypted by ransomware, the data encrypted by the ransomware is stored in the Vault area. Therefore, there is still such a problem in identifying the data at the time point before infection by the ransomware when actual recovery using backup data in the Vault area is required, which is time-consuming. Further, there is such a problem that the above-mentioned second countermeasure cannot prevent the ransomware attack itself, and particularly, it cannot address the exfiltration of data by ransomware.

The above-mentioned third countermeasure requires monitoring of endpoint file access logs. As with the virus checking software in the above-mentioned first countermeasure, the above-mentioned third countermeasure requires that the file access log generation function be working properly at all endpoints connected to the network. Therefore, there is such a problem that if there are endpoints where the file access log generation function is not working properly, or if the file access log generation function is stopped or the log is falsified by ransomware, the ransomware cannot be detected and the ransomware attack cannot be prevented.

The present invention has been made in view of the above-mentioned problems, and the objective of the present invention is to provide a storage access monitoring method and a storage access monitoring device that can detect ransomware infection of an endpoint at an early stage and prevent data encryption and data exfiltration by monitoring access to a storage device, even if ransomware countermeasures are not sufficiently implemented on the endpoint.

Means to Solve the Problem

In order to achieve the above objective, a storage access monitoring method according to the present invention is a storage access monitoring method implemented by a computer and has: an operation information acquisition step to acquire, as operation information, an operation status of a volume that constitutes a storage device that allows a host device to read/write data through a network; a ransomware operation determination step to determine whether or not there is a possibility that ransomware is running on the host device based on the operation information of the volume; and an abnormality report notification step to output an abnormality report when there is a possibility that the ransomware is running, wherein the ransomware operation determination step includes: a comparative analysis step to determine that a behavior related to latest operation information is abnormal by comparing the latest operation information and past operation information; a pattern comparison step to determine that the behavior related to the latest operation information is abnormal by determining whether or not there is a behavioral pattern that indicates a possibility of an effect of the ransomware in the latest operation information; and a trend comparison step to determine that the behavior related to the latest operation information is abnormal by determining whether or not an operation related to the latest operation information is different from a normal operation related to the past operation information, and it is determined that there is a possibility that the ransomware is running on the host device, in the case that the behavior related to the latest operation information is determined to be abnormal in any one or more of the comparative analysis step, the pattern comparison step, and the trend comparison step.

According to the above process, it is possible to determine whether or not ransomware is running on the host device that uses the data stored in the storage device through the network by monitoring the operation status of the volumes that constitute the storage device. Therefore, even in the case that the virus checking software is not installed on the host device which is an endpoint or the virus checking software has not been updated to the latest pattern file, it is possible to grasp the security status of the host device and detect ransomware infection. Further, even if there are a large number of host devices, the storage access monitoring device can centrally monitor the security status, thereby improving security level and reducing operation costs.

According to the above process, since an abnormal behavior can be detected by monitoring the operation status of the volumes that constitute the storage device, it is possible to detect ransomware infection having unknown characteristics that cannot be detected by conventional virus checking software. Further, since the abnormal behavior that may be caused by the effect of ransomware can be found at an early stage, data encryption and data exfiltration by ransomware can be prevented at an early stage. Further, since data recovery can be quickly performed, it is possible to minimize the impact on business operations.

In the storage access monitoring method according to the present invention, in the above process, the operation information may include: a number of sequential reads, a number of sequential writes, a number of random reads, and a number of random writes for each logical unit of the volume, and a number of sequential reads, a number of sequential writes, a number of random reads, and a number of random writes for each logical block address of the logical unit.

According to the above process, it is possible to determine whether or not ransomware is running on the host device, by monitoring the number of sequential reads, the number of sequential writes, the number of random reads, and the number of random writes for each logical unit of the volume, as well as the number of sequential reads, the number of sequential writes, the number of random reads, and the number of random writes for each logical block address of the logical unit, as the operation status of the volumes that constitute the storage device.

The storage access monitoring method according to the present invention, in the above process, may have a ratio calculation step to calculate: a read/write ratio that is a ratio of the sum of the number of sequential reads and the number of random reads to the sum of the number of sequential writes and the number of random writes; and a sequential/random ratio that is a ratio of the sum of the number of sequential reads and the number of sequential writes to the sum of the number of random reads and the number of random writes, wherein the behavior related to the latest operation information is determined to be abnormal in the comparative analysis step, in the case of determining that the read/write ratio regarding the latest operation information and the read/write ratio regarding the past operation information are reversed and in the case of determining that the sequential/random ratio regarding the latest operation information and the sequential/random ratio regarding the past operation information are reversed.

According to the above process, it is possible to determine that ransomware is running on the host device in the case that there occurs a behavior in which the read/write ratio is reversed over time, or there occurs a behavior in which the sequential/random ratio is reversed over time.

The storage access monitoring method according to the present invention, in the above process, may have: a file information acquisition step to acquire, as file information, information related to reading/writing of files in the volume by the host device; and a mapping step to perform mapping between the file information and the logical block address of the logical unit, wherein the behavior related to the latest operation information is determined to be abnormal in the pattern comparison step in the case of determining that only a header portion of the file has been rewritten.

According to the above process, it is possible to determine that ransomware is running on the host device in the case that a behavior such as rewriting only the header portion of the file occurs.

The storage access monitoring method according to the present invention, in the above process, may have a statistics calculation step to calculate a mean value and a standard deviation value regarding the latest operation information and a mean value and a standard deviation value regarding the past operation information, wherein the behavior related to the latest operation information is determined to be abnormal in the trend comparison step, in the case of determining that the statistical distribution acquired from the mean value and the standard deviation value regarding the latest operation information deviates beyond a predetermined condition from the statistical distribution acquired from the mean value and the standard deviation value regarding the past operation information.

According to the above process, it is possible to determine that ransomware is running on the host device in the case that the operation status of the volume deviates from the normal operation without the effect of ransomware.

In the storage access monitoring method according to the present invention, in the above process, the behavior related to the latest operation information may be determined to be abnormal in the case that numerical values of the mean value±standard deviation value regarding the latest operational information fall outside the range determined by the mean value±2× standard deviation value regarding the past operation information.

According to the above process, it is possible to determine that ransomware is running on the host device in the case that the mean value and standard deviation value representing the operation status of the volume are calculated, and then the mean value and the standard deviation value exceed a predetermined condition.

In the storage access monitoring method according to the present invention, in the above process, it may be determined that there is a possibility that the ransomware is running on the host device in the case that the behavior related to the latest operation information is determined to be abnormal in all steps of the comparative analysis step, the pattern comparison step, and the trend comparison step.

According to the above process, since it is determined that ransomware is running on the host device when the abnormal behavior is detected in all steps of the comparative analysis step, the pattern comparison step, and the trend comparison step, it is possible to reliably detect the case with a higher possibility of the effect caused by ransomware and reduce the misdetection (false positive).

Further, in order to achieve the above objective, the storage access monitoring device according to the present invention has: an operation information acquisition unit that acquires, as operation information, an operation status of a volume that constitutes a storage device that allows a host device to read/write data through a network; a ransomware operation determination unit that determines whether or not there is a possibility that ransomware is running on the host device based on the operation information of the volume; and an abnormality report notification unit that outputs an abnormality report when there is a possibility that the ransomware is running, wherein the ransomware operation determination unit is configured to perform: a comparative analysis process to determine that a behavior related to latest operation information is abnormal by comparing the latest operation information and past operation information; a pattern comparison process to determine that the behavior related to the latest operation information is abnormal by determining whether or not there is a behavioral pattern that indicates a possibility of an effect of the ransomware in the latest operation information; and a trend comparison process to determine that the behavior related to the latest operation information is abnormal by determining whether or not an operation related to the latest operation information is different from a normal operation related to the past operation information, and it is determined that there is a possibility that the ransomware is running on the host device, in the case that the behavior related to the latest operation information is determined to be abnormal in any one or more of the comparative analysis process, the pattern comparison process, and the trend comparison process.

According to the above configuration, it is possible to determine whether or not ransomware is running on the host device that uses data stored in the storage device through the network by monitoring the operation status of the volumes that constitute the storage device. Therefore, even in the case that the virus checking software is not installed on the host device which is an endpoint or the virus checking software has not been updated to the latest pattern file, it is possible to grasp the security status of the host device and detect ransomware infection. Further, even if there are a large number of host devices, the storage access monitoring device can centrally monitor the security status, thereby improving security level and reducing operation costs.

According to the above configuration, since an abnormal behavior can be detected by monitoring the operation status of the volumes that constitute the storage device, it is possible to detect ransomware infection having unknown characteristics that cannot be detected by conventional virus checking software. Further, since the abnormal behavior that may be caused by the effect of ransomware can be found at an early stage, data encryption and data exfiltration by ransomware can be prevented at an early stage. Further, since data recovery can be quickly performed, it is possible to minimize the impact on business operations.

Effect of the Invention

The present invention has the advantageous effect of detecting ransomware infection of an endpoint at an early stage by monitoring access to a storage device and preventing data encryption and data exfiltration even if ransomware countermeasures are not sufficiently implemented on the endpoint, thus minimizing the impact on business operations. Furthermore, the present invention also has the advantageous effect of detecting infection of unknown ransomware at an early stage.

BRIEF EXPLANATION OF DRAWINGS

FIG. 3 is a diagram showing an example of a by-logical-unit operation information management table according to the embodiment of the present invention.

FIG. 4 is a diagram showing an example of a by-file operation information management table according to the embodiment of the present invention.

FIG. 6 is a diagram showing the by-logical-unit operation information management table updated in step ST2 of the flow diagram shown in FIG. 5.

FIG. 7 is a diagram showing the by-file operation information management table updated in step ST2 of the flow diagram shown in FIG. 5.

FIG. 8 is a diagram showing the by-file operation information management table updated in step ST3 of the flow diagram shown in FIG. 5.

FIG. 10 is a diagram showing areas of the by-logical-unit operation information management table referred to in step ST5 of the flow diagram shown in FIG. 5.

FIG. 11 is a diagram showing areas of the by-file operation information management table referred to in step ST7 of the flow diagram shown in FIG. 5.

DETAILED DESCRIPTION OF EMBODIMENTS

Hereinafter, an embodiment of the present invention will be described with reference to drawings.

Figure 1:
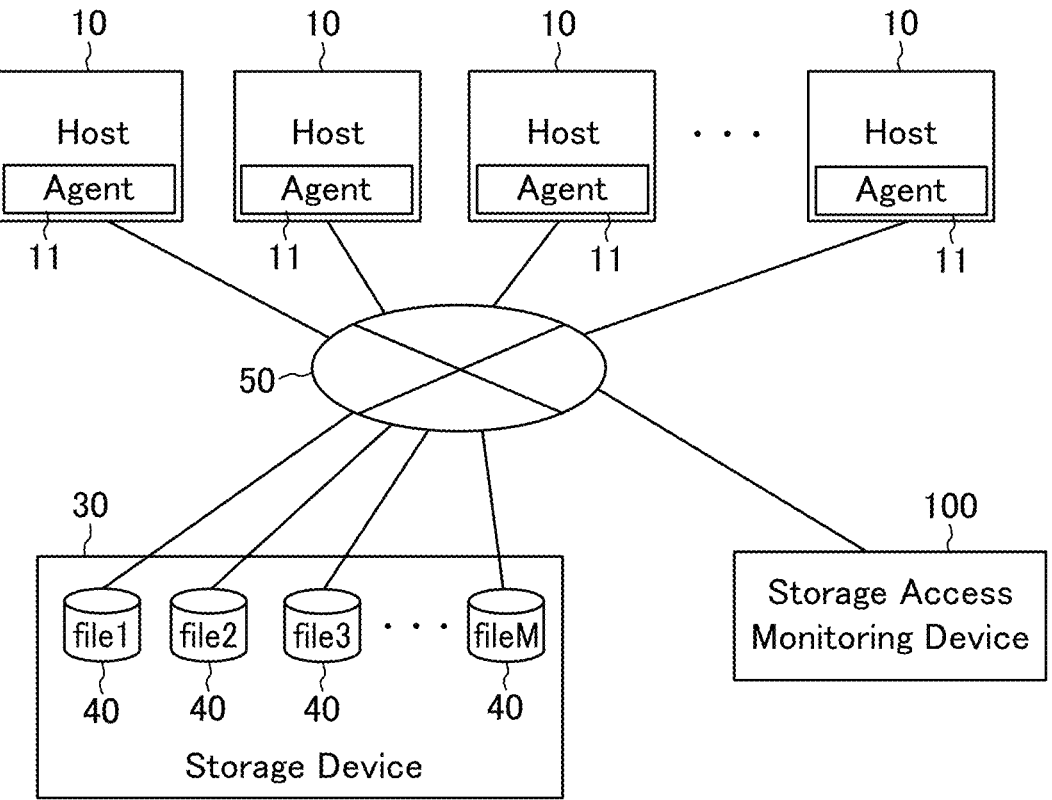
FIG. 1 is a system configuration diagram showing an example of a network system according to an embodiment of the present invention.

First, the system configuration according to the present embodiment will be described with reference to FIG. 1. FIG. 1 is a system configuration diagram showing an example of a network system according to the present embodiment.

The network system shown in FIG. 1 is generally constituted by: a host device 10 (hereinafter referred to as host 10); a storage device 30; and a storage access monitoring device 100. The host 10, the storage device 30, and the storage access monitoring device 100 can be connected to a network 50 such as an internet.

The host 10 is an information terminal device such as a personal computer (PC) or a tablet terminal that can be used by a user. Further, the host 10 may be a server device that manages each user's information terminal device as a client. The host 10 is configured to be capable of accessing the storage device 30 through the network 50 and reading/writing files stored in the storage device 30.

As shown in FIG. 1, a plurality of hosts 10 may exist. Each of the plurality of users may own a host 10, or the plurality of users may share one host 10. However, the number of hosts 10 is not particularly limited, and only one host 10 may exist. Host 10 is sometimes referred to as a client computing device or endpoint.

An agent 11 is operating on the host 10. The agent 11 has a function to execute a specific task by executing an agent program on the host 10.

The agent 11 in the present embodiment has function to specify files that the host 10 accesses and reads/writes from the storage device 30 on the network 50, and a function to record log information regarding reading/writing of files in the storage device 30 (for example, information regarding actions performed on files and date and time) as file information. Further, the agent 11 in the present embodiment has a function to provide the file information to the storage access monitoring device 100 in cooperation with the storage access monitoring device 100.

The storage device 30 has a data storage function to store files. The storage device 30 in the present embodiment operates as a network storage that can be accessed through the network 50. The host 10 can access the storage device 30 through the network 50 and can read/write files that are stored in the storage device 30.

The storage device 30 provides a physical space for storing data and is configured to be provided with a plurality of volumes 40. The volume 40 is a logical area for storing data, and is constituted by a plurality of logical units (LUs). Usually, one file is stored in one volume 40. In FIG. 1, a state in which each file is stored in each volume 40 is schematically shown.

The storage access monitoring device 100 has a function to monitor whether or not an abnormality has occurred in the behavior of each volume 40 managed by the storage device 30, based on the operation status of the storage device 30. Further, the storage access monitoring device 100 has a function to notify the administrator of an abnormality report when an abnormality occurs in the behavior of each volume 40. The storage access monitoring device 100 in the present embodiment is configured to be capable of detecting an abnormal behavior caused by the effect of ransomware.

Figure 2:
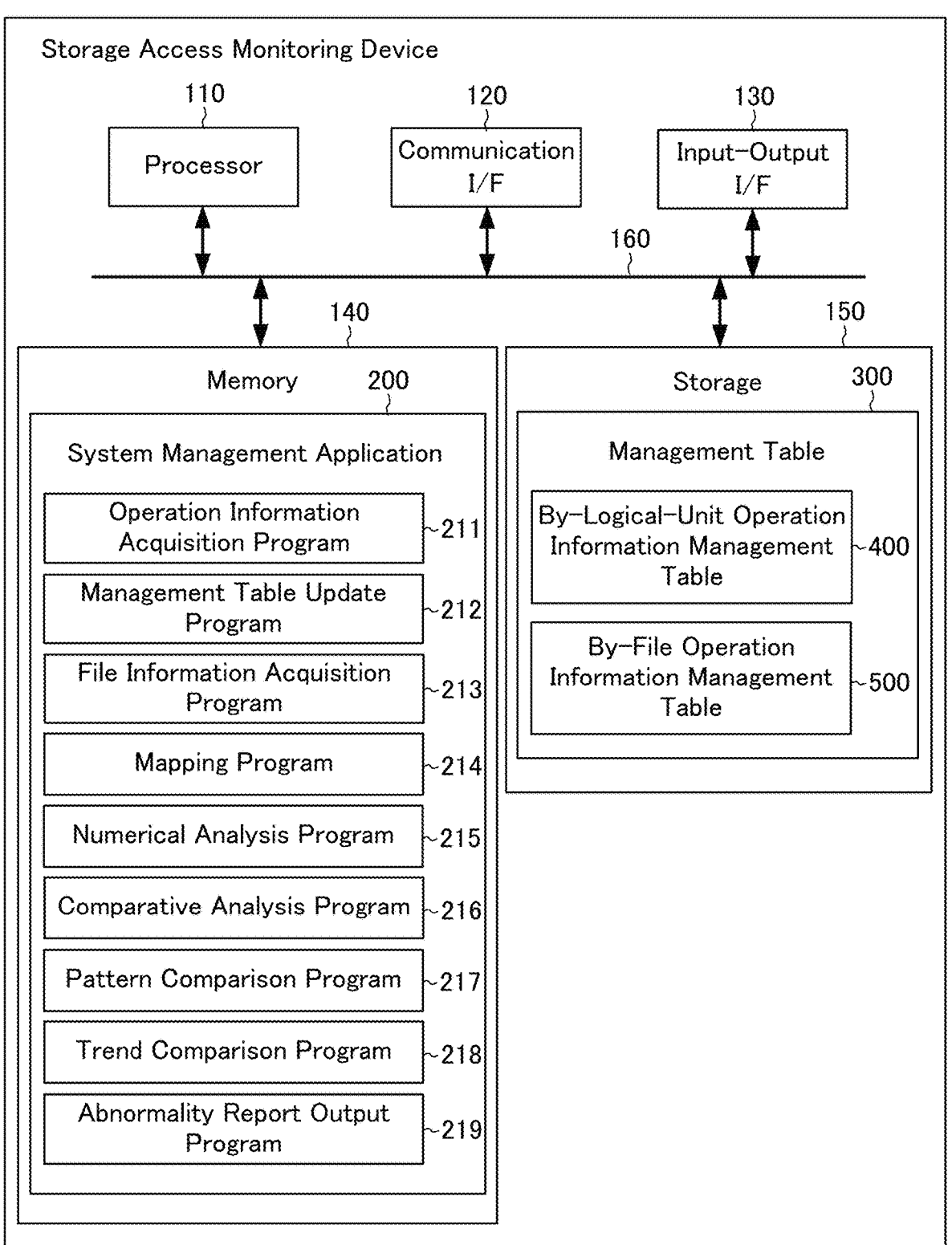
FIG. 2 is a functional block diagram showing an example of a configuration of a storage access monitoring device according to the embodiment of the present invention.

The configuration of the storage access monitoring device 100 according to the present embodiment will be described with reference to FIG. 2. FIG. 2 is a functional block diagram showing an example of the configuration of the storage access monitoring device 100 according to the present embodiment.

The storage access monitoring device 100 shown in FIG. 2 is generally configured to include a processor 110, a communication interface (communication I/F) 120, an input-output interface (input-output I/F) 130, a memory 140, and a storage 150. The processor 110, the communication I/F 120, the input-output I/F 130, the memory 140, and the storage 150 are connected by a bus 160.

The processor 110 is a central processing unit (CPU) or the like, and has a function to perform control processing and calculation processing in the storage access monitoring device 100. By the processor 110 executing various programs, the storage access monitoring device 100 can realize various functions corresponding to the various programs.

The communication I/F 120 has a function to communicate with various external devices via the network 50. The storage access monitoring device 100 in the present embodiment is capable of acquiring the operation status of each volume 40 from the storage device 30 as operation information through the communication I/F 120 and the network 50, and is also capable of acquiring file information from the agent 11 of the host 10.

The input-output I/F 130 is an interface to which an operator can connect various devices for operating the storage access monitoring device 100. A console including, for example, input devices such as a keyboard and mouse, and output devices such as a display and a speaker can be connected to the input-output I/F 130.

The memory 140 is a main storage device that can be used by the processor 110, and the storage 150 is an auxiliary storage device that can be accessed by the processor 110. When the processor 110 executes various programs, the various programs are stored in the memory 140. Further, the processor 110 is designed to be capable of processing various data stored in the storage 150. FIG. 2 shows a state in which the processor 110 reads various programs included in the system management application 200 and stores them in the memory 140, and a state in which the management table 300 is stored in the storage 150.

The system management application 200 that can be executed by the processor 110 includes an operation information acquisition program 211, a management table update program 212, a file information acquisition program 213, a mapping program 214, a numerical analysis program 215, a comparative analysis program 216, a pattern comparison program 17, a trend comparison program 218 and an abnormality report output program 219.

The operation information acquisition program 211 is executed by the processor 110 of the storage access monitoring device 100, whereby a function as an operation information acquisition unit in the storage access monitoring device 100 is implemented. The operation information acquisition unit realized by the operation information acquisition program 211 has a function to periodically acquire the operation status of each volume 40 of the storage device 30 as operation information.

The operation information acquired by the storage access monitoring device 100 includes the operation history of the host 10 accessing the storage device 30 and reading/writing data in each volume 40. Specifically, the operation information includes, for example, the number of inputs/outputs (I/Os) within a unit time, I/O characteristics for a logical unit (LU), and I/O characteristics for a file (logical block address (LBA)).

The number of I/Os within a unit time is the number of times data stored in each volume 40 is read/written within a unit time. The unit time can be set as appropriate depending on the load on the storage device 30 and the storage access monitoring device 100, and the like. The unit time is the sampling time of the target data, and for example, by setting the unit time to a short period (for example, about 1 second to 1 minute), the abnormal behavior caused by the effect of ransomware can be found at an early stage. The time interval at which the storage access monitoring device 100 periodically acquires operation information from the storage device 30 may be the same as the unit time.

The I/O characteristics for the logical unit (LU) are the number of sequential reads/writes (Sequential Read/Write) and the number of random reads/writes (Random Read/Write) for each logical unit in each volume 40.

Here, sequential read/write and random read/write represent methods of accessing data. Sequential read refers to a data access mode in which data is read out sequentially. Sequential write refers to a data access mode in which data is written sequentially. Random read refers to a data access mode in which data is read out randomly. Random write refers to a data access mode in which data is written randomly.

The number of sequential reads/writes for each logical unit in each volume 40 is a value acquired by measuring the number of times of sequential reads and sequential writes in each volume 40 for each logical unit. The number of random reads/writes for each logical unit in each volume 40 is a value acquired by measuring the number of times of random reads and random writes in each volume 40 for each logical unit. The number of sequential reads/writes and the number of random reads/writes for each logical unit in each volume 40 can be expressed as a rate divided by a unit time (for example, a rate per second).

The I/O characteristics for a file (logical block address (LBA)) are the number of sequential reads/writes and the number of random reads/writes for each logical block address in each volume 40.

The number of sequential reads/writes for each logical block address in each volume 40 is a value acquired by measuring the number of times of sequential reads and sequential writes for each logical block address in each volume 40. The number of random reads/writes for each logical block address in each volume 40 is a value acquired by measuring the number of times of random reads and random writes for each logical block address in each volume 40. The number of sequential reads/writes and the number of random reads/writes for each logical block address in each volume 40 can be expressed as a rate divided by a unit time (for example, a rate per second).

The management table update program 212 is executed by the processor 110 of the storage access monitoring device 100, whereby a function as a management table update unit is implemented in the storage access monitoring device 100. The management table update unit realized by the management table update program 212 has a function to read out and reference the management table 300 stored in the storage 150 and a function to write the information acquired or calculated by the storage access monitoring device 100 to the management table 300 and update the management table 300.

The file information acquisition program 213 is executed by the processor 110 of the storage access monitoring device 100, whereby a function as a file information acquisition unit is implemented in the storage access monitoring device 100. The file information acquisition unit realized by the file information acquisition program 213 has a function to acquire the file information from the agent 11 of the host 10.

The mapping program 214 is executed by the processor 110 of the storage access monitoring device 100, whereby a function as a mapping unit is implemented in the storage access monitoring device 100. The mapping unit realized by the mapping program 214 has a function to perform mapping between the file information acquired from the agent 11 of the host 10 and the block address of each volume 40 of the storage device 30.

The numerical analysis program 215 is executed by the processor 110 of the storage access monitoring device 100, whereby a function as a numerical analysis unit is implemented in the storage access monitoring device 100. The numerical analysis unit realized by the numerical analysis program 215 has a function to calculate numerical values such as ratios or statistics by using the values stored in the management table 300.

The comparative analysis program 216 is executed by the processor 110 of the storage access monitoring device 100, whereby a function as a comparative analysis unit is implemented in the storage access monitoring device 100. The comparative analysis unit realized by the comparative analysis program 216 has a function to compare the operation information acquired from the storage device 30 and the previously acquired operation information to check whether or not there is any abnormality. The comparative analysis program 216 constitutes a part of the ransomware operation determination program, and the comparative analysis unit realized by the comparative analysis program 216 constitutes a part of the ransomware operation determination unit realized by the ransomware operation determination program.

The pattern comparison program 217 is executed by the processor 110 of the storage access monitoring device 100, whereby a function as a pattern comparison unit is implemented in the storage access monitoring device 100. The pattern comparison unit realized by the pattern comparison program 217 has a function to check whether or not there is a change pattern possibly caused by ransomware (that is, an abnormal pattern different from normal pattern) in the operation information acquired from the storage device 30. The pattern comparison program 217 constitutes a part of the ransomware operation determination program, and the comparison analysis unit realized by the pattern comparison program 217 constitutes a part of the ransomware operation determination unit realized by the ransomware operation determination program.

The trend comparison program 218 is executed by the processor 110 of the storage access monitoring device 100, whereby a function as a trend comparison unit is implemented in the storage access monitoring device 100. The trend comparison unit realized by the trend comparison program 218 has a function to analyze whether or not the statistics calculated from the operation information acquired from the storage device 30 show an abnormal trend with respect to the statistics of the operation information during the normal operation. The trend comparison program 218 constitutes a part of the ransomware operation determination program, and the trend comparison unit realized by the trend comparison program 218 constitutes a part of the ransomware operation determination unit realized by the ransomware operation determination program.

The abnormality report output program 219 is executed by the processor 110 of the storage access monitoring device 100, whereby a function as an abnormality report output unit is implemented in the storage access monitoring device 100.

The abnormality report output unit realized by the abnormality report output program 219 has a function to output an abnormality report indicating that the abnormal behavior has occurred. The abnormality report may be notified through a console connected to the input-output I/F 130, or by an e-mail and the like addressed to a predetermined e-mail address.

The management table 300 that can be referenced and updated by the processor 110 includes a by-logical-unit operation information management table 400 and a by-file operation information management table 500.

The by-logical-unit operation information management table 400 will be explained with reference to FIG. 3. FIG. 3 is a diagram showing an example of the by-logical-unit operation information management table 400 according to the present embodiment. In FIG. 3, as an example, the by-logical-unit operation information management table 400 is expressed as a tabular table in which each row (record) and each column (column) is set, but it is not limited to this, and any arbitrary data storage structure can be adopted. Further, although only the columns (columns) used in the present embodiment are shown in the by-logical-unit operation information management table 400 shown in FIG. 3, other columns (columns) may be set.

The by-logical-unit operation information management table 400 shown in FIG. 3 is capable of storing operation information indicating the operation status of the storage device 30 as data records (row) for each logical unit, and is also capable of storing numerical values calculated by execution of the numerical analysis program 215.

A "Logical Unit Name" column 401, an "Acquisition Date and Time" column 402, an "Acquired Data" column 410, and an "Analysis" column 420 are set in each column (each column) of the by-logical-unit operation information management table 400 shown in FIG. 3.

The "Logical Unit Name" column 401 stores the logical unit identification information for identifying the logical unit of each volume 40. The "Acquisition Date and Time" column 402 stores the date and time when the operation information of each logical unit was acquired.

The "Acquired Data" column 410 stores operation information for each logical unit of each volume 40 that constitutes the storage device 30. In the "Acquired Data" column 410, a "Sequential Read Number" column 411, a "Sequential Write Number" column 412, a "Random Read Number" column 413, and a "Random Write Number" column 414 are set.

The "Sequential Read Number" column 411 stores the number of sequential reads included in the acquired operation information. The "Sequential Write Number" column 412 stores the number of sequential writes included in the acquired operation information. The "Random Read Number" column 413 stores the number of random reads included in the acquired operation information. The "Random Write Number" column 414 stores the number of random writes included in the acquired operation information.

The "Analysis" column 420 stores analysis results for the acquired operation information. In the "Analysis" column 420, a "Sequential Read Statistics" column 430, a "Sequential Write Statistics" column 440, a "Random Read Statistics" column 450, and a "Random Write Statistics" column 460 are set.

The "Sequential Read Statistics" column 430 stores statistics calculated from the number of sequential reads. In the "Sequential Read Statistics" column 430, a "Mean Value" column 431 is set to store the mean value, and a "Standard Deviation" column 432 is set to store the standard deviation value. The "Sequential Write Statistics" column 440 stores the statistics calculated from the number of sequential writes. In the "Sequential Write Statistics" column 440, a "Mean Value" column 441 is set to store the mean value, and a "Standard Deviation" column 442 is set to store the standard deviation value. The "Random Read Statistics" column 450 stores statistics calculated from the number of random reads. In the "Random Read Statistics" column 450, a "Mean Value" column 451 is set to store the mean value, and a "Standard Deviation" column 452 is set to store the standard deviation value. The "Random Write Statistics" column 460 stores statistics calculated from the number of random writes. In the "Random Write Statistics" column 460, a "Mean Value" column 461 is set to store the mean value, and a "Standard Deviation" column 462 is set to store the standard deviation value.

Further, in the "Analysis" column 420, a "Read/Write Ratio" column 470 and a "Sequential/Random Ratio" column 480 are set. The "Read/Write Ratio" column 470 stores the ratio of the sum of the number of sequential reads and the number of sequential writes to the sum of the number of random reads and the number of random writes. The "Sequential/Random Ratio" column 480 stores the ratio of the sum of the number of sequential reads and the number of random reads to the sum of the number of sequential writes and the number of random writes.

Operation information is periodically acquired at predetermined time intervals. In the by-logical-unit operation information management table 400, operation information and its analysis results are accumulated as data records in units of acquisition date and time.

The by-file operation information management table 500 will be explained with reference to FIG. 4. FIG. 4 is a diagram showing an example of the by-file operation information management table 500 according to the present embodiment. In FIG. 4, as an example, the by-file operation information management table 500 is expressed as a tabular table in which each row (record) and each column (column) are set, but it is not limited to this, and any arbitrary data storage structures can be adopted. Further, although only the columns (columns) used in the present embodiment are shown in the by-file operation information management table 500 shown in FIG. 4, other columns (columns) may be set.

The by-file operation information management table 500 shown in FIG. 4 is capable of storing operation information indicating the operation status of the storage device 30 as data records (row) for each block address, and is also capable of storing file information acquired from the agent 11 of the host 10, associated with each block address by mapping.

A "Logical Unit Name" column 501, a "File Name" column 502, an "LBA Flag" column 503, a "Block Address" column 504, an "Acquisition Date and Time" column 505, and an "Acquired Data" column 510 are set in each column (each column) of the by-file operation information management table 500 shown in FIG. 4.

The "logical unit name" column 501 stores logical unit identification information for identifying the logical unit of each volume 40. The logical unit identification information stored in the "Logical Unit Name" column 501 is the same as the logical unit identification information stored in the "Logical Unit Name" column 401 of the by-logical-unit operation information management table 400 shown in FIG. 3. The data records of the by-logical-unit operation information management table 400 and the data records of the by-file operation information management table 500 are associated by the same logical unit identification information.

The "File Name" column 502 and the "LBA Flag" column 503 store file information acquired from the agent 11 of the host 10. The "File Name" column 502 stores a file name identified by file information. The "LBA Flag" column 503 stores flag information ("Y" or "N") indicating whether or not an LBA is included. The LBA includes the header portion of the file, and when data with the flag information "Y" is written, it means that the header portion of the file has been rewritten.

It should be noted that the file information is not explicitly associated with the block address in each volume 40. Therefore, which block address of which volume 40 the file information corresponds to is determined, through mapping, by reference to the file information acquired from the agent 11 of the host 10, and based on the mapping result, the file information is stored in the "File Name" column 502 and "LBA Flag" column 503 of the data record of the corresponding block address The "Block Address" column 504 stores block address identification information for identifying the block address in each logical unit of each volume 40.

The "Acquisition Date and Time" column 505 and the "Acquired Data" column 510 store operation information for each logical unit of each volume 40 that constitutes the storage device 30.

The "Acquisition Date and Time" column 505 stores the date and time when the operation information related to each block address of each logical unit was acquired.

The "Acquired Data" column 510 stores the operation information for each logical unit of each volume 40 that constitutes the storage device 30 by block address. A "Sequential Read Number" column 511, a "Sequential Write Number" column 512, a "Random Read Number" column 513, and a "Random Write Number" column 514 are set in the "Acquired Data" column 510.

The "Sequential Read Number" column 511 stores the number of sequential reads included in the acquired operation information. The "Sequential Write Number" column 512 stores the number of sequential writes included in the acquired operation information. The "Random Read Number" column 513 stores the number of random reads included in the acquired operation information. The "Random Write Number" column 514 stores the number of random writes included in the acquired operation information.

The operation information is periodically acquired at predetermined time intervals. In the by-file operation information management table 500, the operation information is accumulated as data records in units of acquisition date and time.

Figure 5:
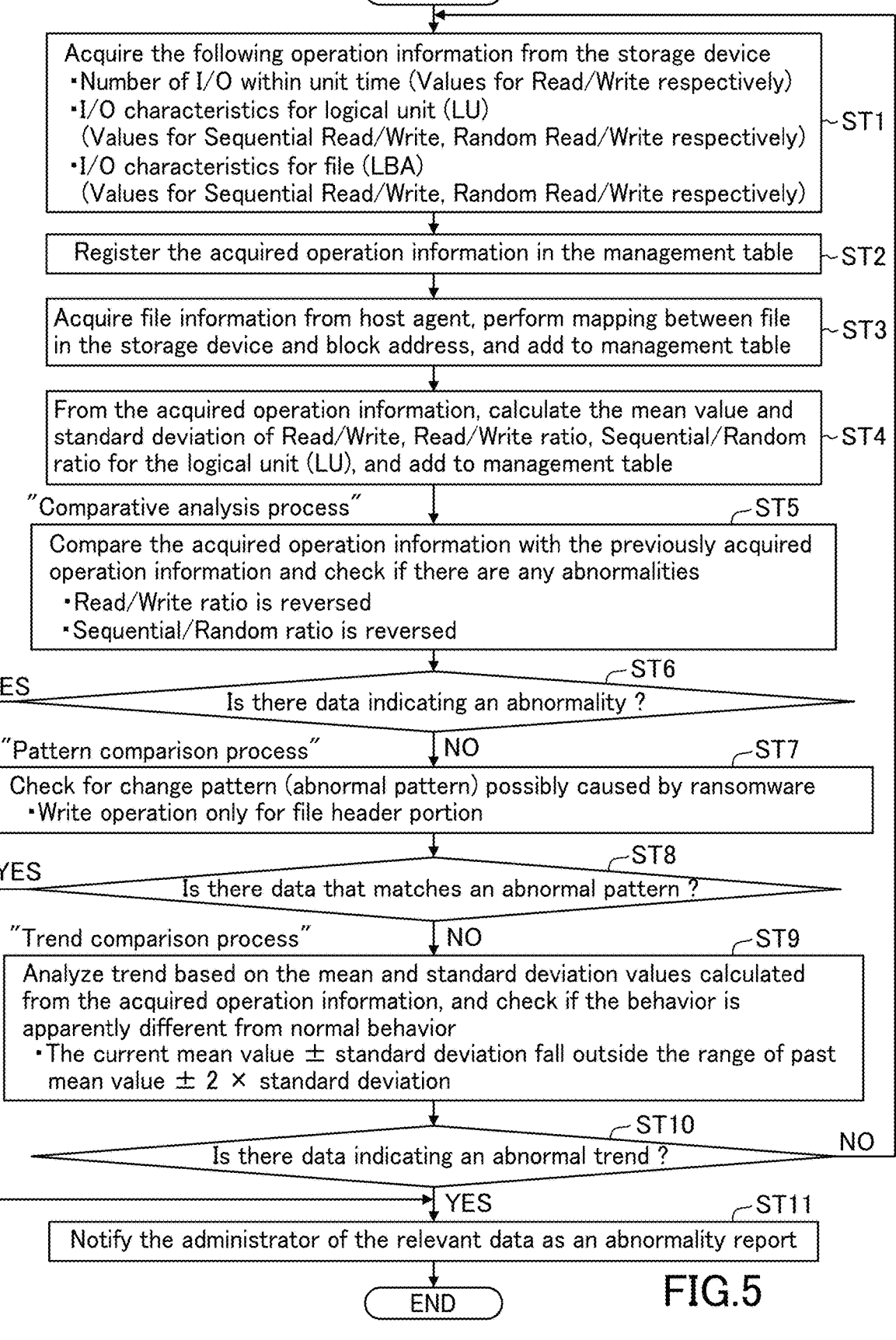
FIG. 5 is a flow diagram showing an example of the operation of the storage access monitoring device according to the embodiment of the present invention.

Next, the operation of the storage access monitoring device 100 will be described with reference to a flow diagram in FIG. 5. FIG. 5 is a flow diagram showing an example of the operation of the storage access monitoring device 100 according to the present embodiment. It should be noted that the operations shown in FIG. 5 will be described with various programs included in the system management application 200 as the main body of the operation, but the main body of the operation may be read as the processor 110 that executes various programs, or may also be read as various functional units realized by the processor 110 executing various programs.

The operation information acquisition program 211 of the storage access monitoring device 100 acquires the operation information from the storage device 30 (step ST1). The operation information acquisition program 211 can constantly monitor input-output (I/O, i.e., reading and writing) with respect to each volume 40 of the storage device 30, and acquire the monitoring results as operation information.

The operation information that the operation information acquisition program 211 acquires from the storage device 30 in step ST1 includes at least the following three types of operation information.

Number of I/Os within a unit time (values for Read/Write respectively)

I/O characteristics for the logical unit (LU) (values for Sequential Read/Write and Random Read/Write respectively)

I/O characteristics for the file (logical block address (LBA)) (values for Sequential Read/Write and Random Read/Write respectively)

The management table update program 212 of the storage access monitoring device 100 registers the operation information of the storage device 30 acquired in step ST1 in the management table 300 (step ST2). The process of step ST2 corresponds to the operation information acquisition step according to the present invention.

Specifically, in the by-logical-unit operation information management table 400, a new data record (row) is created corresponding to each logical unit identification information stored in the "Logical Unit Name" column 401, and then the acquisition date and time of the operation information is added to the "Acquisition Date and Time" column 402 and various operation information is registered in the "Acquired Data" column 410.

In the by-logical-unit operation information management table 400, the number of sequential reads is stored in the "Sequential Read Number" column 411, the number of sequential writes is stored in the "Sequential Write Number" column 412, the number of random reads is stored in the "Random Read Number" column 413, and the number of random writes is stored in the "Random Write Number" column 414.

FIG. 6 shows the by-logical-unit operation information management table 400 updated in step ST2. In the step ST2, the acquisition date and time and the numerical values regarding the current operation information (the latest operation information) are added to each column in region R1 shown in FIG. 6.

Specifically, in the by-file operation information management table 500, a new data record (row) is created corresponding to each block address identification information stored in the "Block Address" column 504, and then the acquisition date and time of the operation information is added to the "Acquisition Date and Time" column 505 and various operation information is registered in the "Acquired Data" column 510.

The number of sequential reads is stored in the "Sequential Read Number" column 511, the number of sequential writes is stored in the "Sequential Write Number" column 512, the number of random reads is stored in the "Random Read Number" column 513, and the number of random writes is stored in the "Random Write Number" column 514.

FIG. 7 shows the by-file operation information management table 500 updated in step ST2. In the step ST2, the acquisition date and time and the numerical values regarding to the current operation information (latest operation information) are added to each column in region R2 shown in FIG. 7.

Next, the file information acquisition program 213 of the storage access monitoring device 100 acquires file information from the agent 11 of the host 10, the mapping program 214 performs mapping between the file in the storage device 30 identified by the file information and the block address of each volume 40, and the management table update program 212 adds it to the management table 300 (step ST3). The step ST3 corresponds to a file information acquisition step and a mapping step according to the present invention.

The file information acquisition program 213 can cooperate with the agent 11 of the host 10 to acquire file information indicating which files the host 10 has accessed for reading or writing in each volume 40. The mapping program 214 can identify from the file information acquired from the agent 11 of the host 10 which block address data was read/written by the host 10 when reading or writing a file, and can perform mapping between the file in the storage device 30 and the block address of each volume 40. Based on this mapping result, the management table update program 212 registers the file name in the "File Name" column 502 of the by-file operation information management table 500, and also registers, in the "LBA Flag" column 503, the flag information ("Y" or "N") indicating whether or not the LBA is included.

FIG. 8 shows the by-file operation information management table 500 updated in step ST3. In the step ST3, the currently acquired file information is written into each column in region R3 shown in FIG. 8.

The numerical analysis program 215 of the storage access monitoring device 100 calculates the mean value and standard deviation of each read and write (Read/Write) to the logical unit (LU), the read/write ratio (Read/Write ratio), and the sequential/random ratio (Sequential/Random ratio) from the operation information acquired from the storage device 30 in step ST1, and the management table update program 212 adds them to the management table 300 (step ST4). The step ST4 corresponds to a ratio calculation step and a statistics calculation step for the present invention Specifically, in the by-logical-unit operation information management table 400, the statistics are calculated, using the number of sequential reads in the "Sequential Read Number" column 411, the number of sequential writes in the "Sequential Write Number" column 412, the number of random reads in the "Random Read Number" column 413, and the number of random writes in "Random Write Number" column 414, which are stored in step ST2, and the calculation results are registered in "Analysis" column 420.

The numerical analysis program 215 calculates the mean value and standard deviation value regarding the normal distribution from the number of sequential reads, and stores the calculated mean value and standard deviation value in the "Mean Value" column 431 and the "Standard Deviation" column 432 of the "Sequential Read Statistics" column 430, respectively.

Further, the numerical analysis program 215 calculates the mean value and standard deviation value regarding the normal distribution from the number of sequential writes, and stores the calculated mean value and standard deviation value in the "Mean Value" column 441 and "Standard Deviation" Column 442 of the "Sequential Write Statistics" column 440, respectively.

Further, the numerical analysis program 215 calculates the mean value and standard deviation value regarding the normal distribution from the number of random reads, and stores the calculated mean value and standard deviation value in the "Mean Value" column 451 and the "Standard Deviation" column 452 of the "Random Read Statistics" column 450, respectively.

Further, the numerical analysis program 215 calculates the mean value and standard deviation value regarding the normal distribution from the number of random writes, and stores the calculated mean value and standard deviation value in the "Mean Value" column 461 and the "Standard Deviation" column 462 of the "Random Write Statistics" column 460, respectively.

Further, the numerical analysis program 215 calculates the ratio of the sum of the number of sequential reads and the number of random reads to the sum of the number of sequential writes and the number of random writes, and stores the calculated read/write ratio in the "Read/Write Ratio" column 470.

Further, the numerical analysis program 215 calculates the ratio of the sum of the number of sequential reads and the number of sequential writes to the sum of the number of random reads and the number of random writes, and stores the calculated sequential/random ratio in the "Sequential/Random Ratio" column 480.

Figure 9:
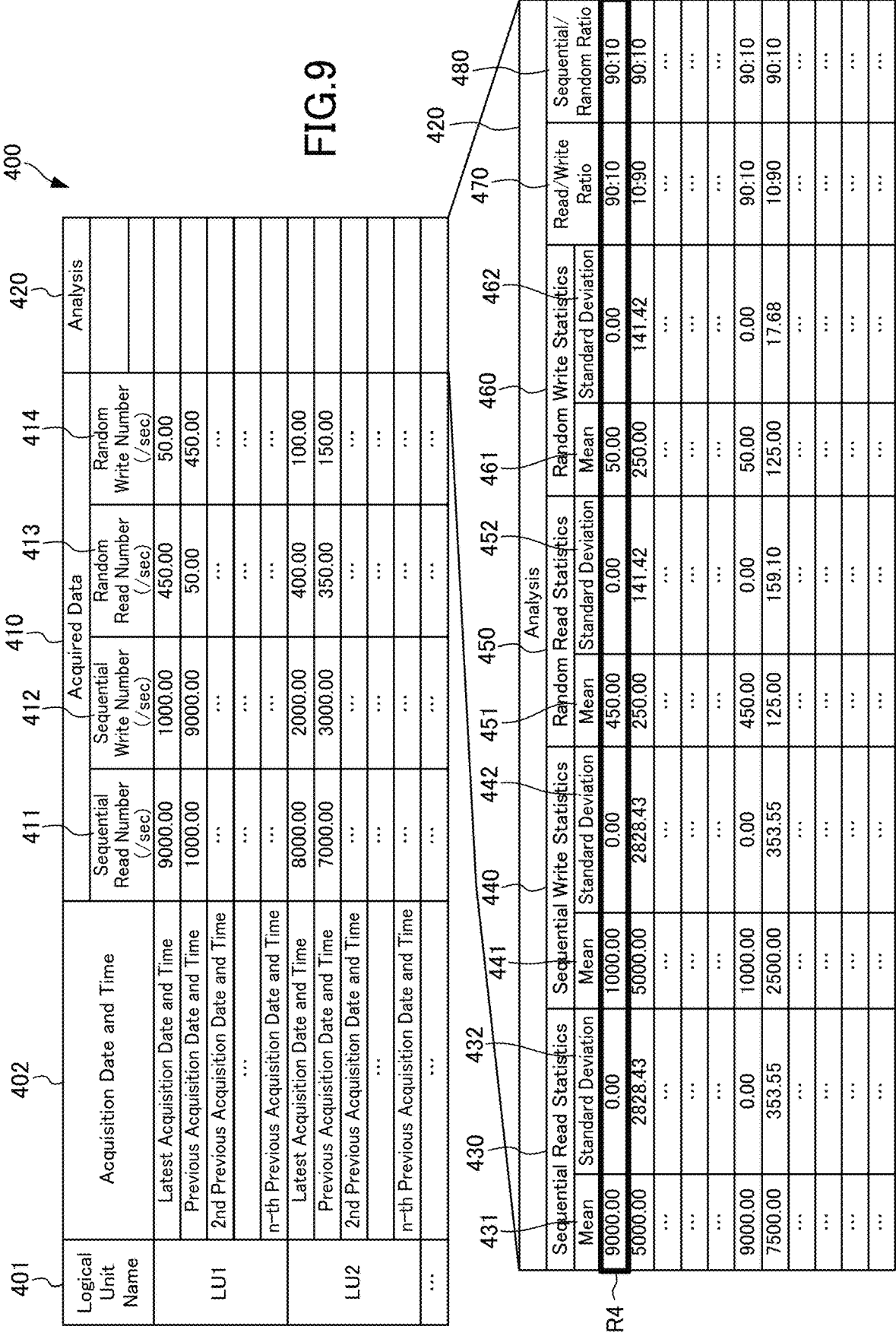
FIG. 9 is a diagram showing the by-logical-unit operation information management table updated in step ST4 of the flow diagram shown in FIG. 5.

FIG. 9 shows the by-logical-unit operation information management table 400 updated in step ST4. In the step ST4, the statistics calculated from the current operation information (the latest operation information) are added to each column in region R4 shown in FIG. 9.

Next, the storage access monitoring device 100 executes each of the comparative analysis process, pattern comparison process, and trend comparison process as described below. All of comparative analysis process, pattern comparison process, and trend comparison process as described below are used to determine whether or not there is a possibility that ransomware is running on the host 10 based on the operation information of the volume 40. The operation information of the volume 40 is acquired periodically, and by determining whether or not the behavior related to the latest operation information is abnormal, it can be determined in real time whether or not there is a possibility that ransomware is running on the host 10.

It should be noted that in the flowchart shown in FIG. 5, the comparative analysis process, the pattern comparison process, and the trend comparison process are executed in this order, but these three processes may be executed in a different order, and these three processes may be executed in parallel. Steps ST5 to ST10 as described below correspond to a ransomware operation determination step according to the present invention.

The comparative analysis program 216 of the storage access monitoring device 100 compares the latest operation information acquired this time with past operation information, and checks whether or not there are any abnormalities, by referring to the by-logical-unit operation information management table 400 (step ST5). As the past operation information, for example, the immediately preceding operation information acquired last time is referred to.

The comparative analysis program 216 refers to the read/write ratio stored in the "Read/Write Ratio" column 470 and compares the currently added read/write ratio with the past read/write ratio. Specifically, region R5 shown in FIG. 10 is referred to. As the past read/write ratio, for example, the immediately preceding read/write ratio (at the previous date and time) can be used.

The read/write ratio represents the balance between reading (Read) and writing (Write). In the present embodiment, in the case that the balance between reading and writing changes significantly compared to the immediately preceding operation information, more specifically, for example, in the case that the read/write ratio added this time and the previous read/write ratio are reversed (in the case that the relationship between the number of Read and the number of Write is reversed), it is determined that the abnormal behavior is occurring due to the effect of ransomware.

Further, the comparative analysis program 216 refers to the sequential/random ratio stored in the "Sequential/Random Ratio" column 480 and compares the currently added sequential/random ratio with the past sequential/random ratio. Specifically, region R6 shown in FIG. 10 is referred to. As the past sequential/random ratio, for example, the immediately preceding sequential/random ratio (at the previous date and time) can be used.

The sequential/random ratio represents the balance between sequential write/read and random write/read. In the present embodiment, when the balance between sequential write/read and random write/read changes significantly compared to the immediately preceding operation information, more specifically, for example, when the newly added sequential/random ratio and the previous sequential/random ratio are reversed (in the case that the relationship between the number of Sequential and the number of Random is reversed), it is determined that the abnormal behavior is occurring due to the effect of ransomware.

In the case that an abnormality is confirmed in the comparison analysis process in step ST5, specifically, in the case that the read/write ratio added this time and the previous read/write ratio are confirmed to be reversed, or the sequential/random ratio added this time and the previous sequential/random ratio are confirmed to be reversed, the comparative analysis program 216 outputs the corresponding data as data indicating an abnormality ("YES" in step ST6). It should be noted that when both the reversal of the read/write ratio and the reversal of the sequential/random ratio are confirmed, the comparative analysis program 216 may output the corresponding data as data indicating an abnormality. The above steps ST5 and ST6 correspond to a comparative analysis step according to the present invention.

The pattern comparison program 217 of the storage access monitoring device 100 refers to the by-file operation information management table 500, and in the latest operation information acquired this time, the pattern comparison program 217 of the storage access monitoring device 100 checks whether or not a change pattern possibly caused by ransomware (i.e., an abnormal pattern that is different from normal) exists (step ST7).

The pattern comparison program 217 refers to the flag information stored in the "LBA Flag" column 503 and checks whether or not the flag information "Y" exists. Specifically, region R7 shown in FIG. 11 is referred to.

The flag information "Y" is information indicating that the header portion of the corresponding file has been rewritten. Some ransomware is known to perform data encryption by rewriting only the header portion of the file. The pattern comparison program 217 refers to the operation information in the block address of the flag information "Y" and the operation information in the block address of the flag information "N". It further checks whether or not the portion other than the header portion has been rewritten in the file of which the header portion has been rewritten. Specifically, region R8 shown in FIG. 11 is referred to. And if only the header portion of the file is rewritten, it is determined that there is a possibility of an abnormal pattern caused by the effect of ransomware.

If an abnormal pattern is confirmed in the pattern comparison process in step ST7, the pattern comparison program 217 outputs the corresponding data as data that matches the abnormal pattern ("YES" in step ST8). The above steps ST7 and ST8 correspond to a pattern comparison step according to the present invention.

The trend comparison program 218 of the storage access monitoring device 100 analyzes the trend based on the mean value and standard deviation value calculated from the latest operation information acquired this time, and checks whether or not there is a trend apparently different from the normal operation (step ST9).

The mean values and standard deviation values calculated in step ST4 and stored in the "Mean Value" column 431 and the "Standard Deviation" column 432, the "Mean Value" column 441 and the "Standard Deviation" column 442, the "Mean Value" column 451 and the "Standard Deviation" column 452, the "Mean Value" column 461 and the "Standard Deviation" column 462 represent the normal distribution of the number of sequential reads, the normal distribution of the number of sequential writes, the normal distribution of the number of random reads, and the normal distribution of the number of random writes, respectively.

Standard deviation is information that indicates data dispersion, and represents the spread of statistical distribution (normal distribution). The trend comparison program 218 can determine whether or not the trend related to the statistics of this time deviates from the trend related to the statistics of the normal operation, by for example, checking whether or not the statistical distribution based on the mean value and standard deviation value regarding to the latest operation information acquired this time is significantly different from the statistical distribution acquired during the normal operation. Specifically, region R8 shown in FIG. 10 is referred to.

The trend during the normal operation used as a determination criterion can be arbitrarily determined from the mean value and standard deviation value acquired in the past. For example, the statistical distribution acquired from the mean value and standard deviation value acquired immediately before (at the previous date and time) may be used as the trend during the normal operation. Alternatively, the statistical distribution acquired from the mean value and standard deviation value during a predetermined period in the past may be used as the trend during the normal operation. The trend during the normal operation represents the trend in the number of sequential reads, the number of sequential writes, the number of random reads, and the number of random writes in the absence of the effect caused by ransomware.

The trend comparison program 218 checks whether or not the mean value and standard deviation value calculated from the latest operation information acquired this time deviates from the trend during the normal operation beyond the predetermined condition, using the trend during the normal operation as a criterion. As a method for determining whether or not there is a significant deviation from the statistical distribution that indicates the normal operation, for example when the mean value±standard deviation value (G) of this time fall outside the range determined by the mean value±2× standard deviation value (2δ) during the normal operation, it can be determined that the behavior may be different from that during the normal operation due to the effect caused by ransomware. Specifically, when the current numerical value (mean value−standard deviation value) is smaller than the (mean value−2×standard deviation value) during the normal operation, or when the current numerical value (mean value±standard deviation value) is larger than the (mean value±2× standard deviation value) during the normal operation, it can be determined that the behavior may be different from that during the normal operation.

When an abnormal trend is found in the trend comparison process in step ST9, specifically, in the case that any of the trends acquired from the statistics of the number of sequential reads, the number of sequential writes, the number of random reads, and the number of random writes is confirmed to deviate from the trend in the normal operation, the trend comparison program 218 outputs the corresponding data as data indicating an abnormal trend ("YES" in step ST10). The above steps ST9 and ST10 correspond to a trend comparison step according to the present invention.

When an abnormality is found in any of the comparative analysis process in step ST5, pattern comparison process in step ST7, and trend comparison process in step ST9 described above, the abnormality report output program 219 of the storage access monitoring device 100 notifies the administrator of the abnormality as an abnormality report (step ST11). The abnormality report may include detailed information including what kind of abnormality was found, which data the abnormality was found in, and the like. The abnormality report may be notified through the console, by email, or the like.

If no abnormality is found in any of the comparative analysis process in step ST5, the pattern comparison process in step ST7, and the trend comparison process in step ST9 described above ("No" in step ST6, "No" in step ST8, and "No" in step ST10), the process returns to step ST1 again to continue. Further, also in the case that the abnormality report is notified to the administrator in step ST11, the process may return to step ST1 again to continue.

It should be noted that in the flow diagram shown in FIG. 5, if an abnormality is found in any one of the comparative analysis process in step ST5, the pattern comparison process in step ST7, and the trend comparison process in step ST9 described above, an abnormality report is notified to the administrator. By this, it is possible to notify the administrator of it when the effect of ransomware is suspected.

However, the abnormality report may be notified to the administrator when an abnormality is found in any two or all three processes selected from the comparative analysis process in step ST5, the pattern comparison process in ST7, and the trend comparison process in ST9 described above. By this, it is possible to reliably detect the case with a higher possibility of the effect caused by ransomware and reduce the misdetection (false positive).

According to the embodiment described above, it is possible to determine whether or not ransomware is running on the host 10 that uses data stored in the storage device 30 through the network 50 by monitoring the operation status of the volumes 40 that constitute the storage device 30. By this, for example, even when ransomware countermeasures on the host 10 are insufficient, such as when the virus checking software is not installed on the host 10 or when the virus checking software has not updated to the latest pattern file, it is possible to grasp the security status of the host 10 and detect ransomware infection. Further, even if there are a large number of hosts 10, the storage access monitoring device 100 can centrally monitor the security status for the large number of hosts 10, thereby improving security level and reducing operation costs.

Furthermore, according to the embodiment described above, it is possible to detect an abnormal behavior by monitoring the operation status of the volumes 40 that constitute the storage device 30. By this, it is possible to detect ransomware infection having unknown characteristics that cannot be detected by conventional virus checking software. Further, since the abnormal behavior that may be caused by the effect of ransomware can be found at an early stage, data encryption and data exfiltration by ransomware can be prevented at an early stage. Further, since data recovery can be quickly performed, it is possible to minimize the impact on business operations.

First Derivative Example

Figure 12:
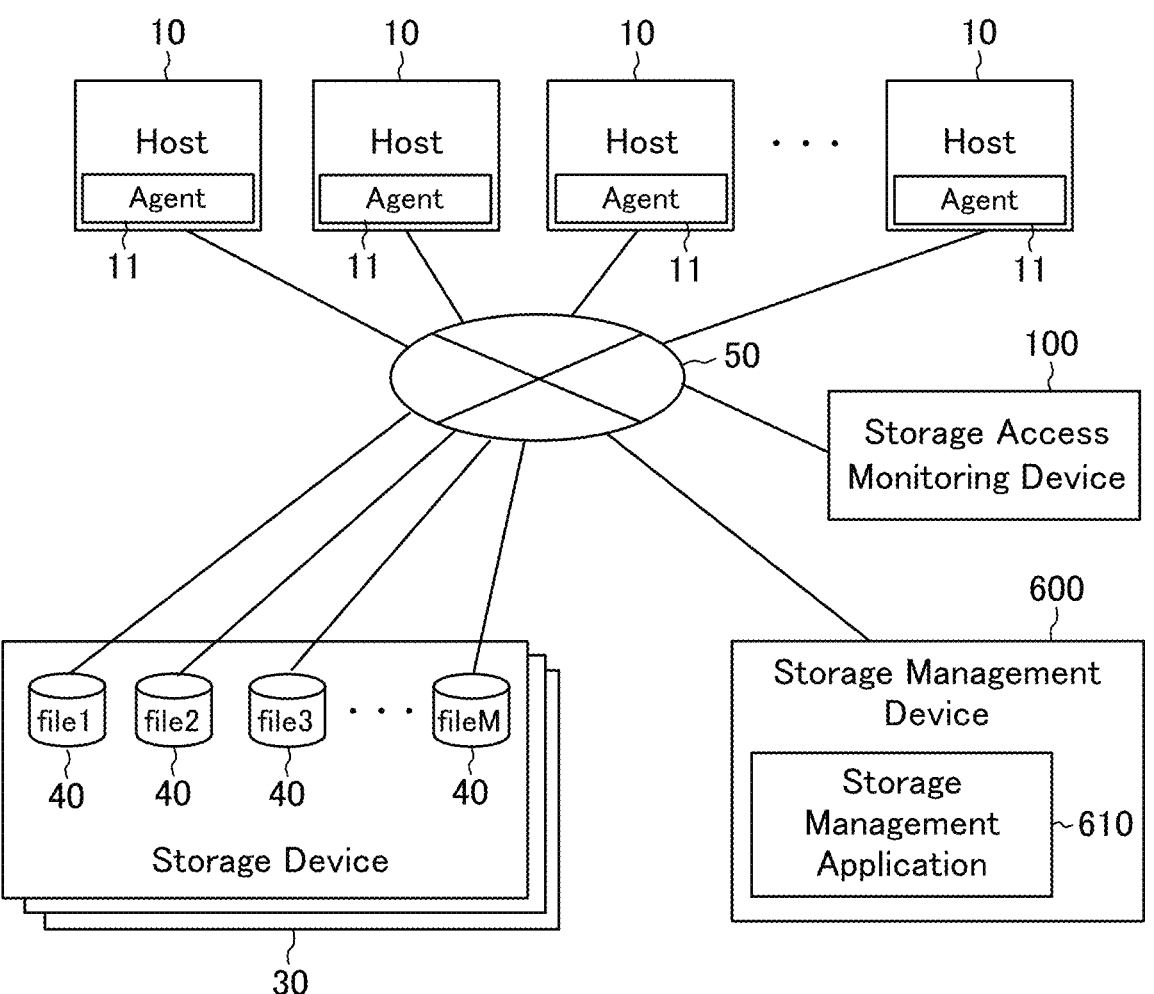
FIG. 12 is a system configuration diagram showing an example of a network system according to a first derivative example of the embodiment of the present invention.

A first derivative example of the present embodiment will be described with reference to FIG. 12. FIG. 12 is a system configuration diagram showing an example of a network system according to the first derivative example of the present embodiment.

The network system shown in FIG. 12 is generally configured by a host 10, a storage device 30, a storage access monitoring device 100, and a storage management device 600. The host 10, the storage device 30, and the storage access monitoring device 100 have the same configuration as the embodiment described above.

In the first derivative example, a plurality of storage devices 30 exist to form a storage device group. The storage management device 600 is a management server that integrally manages the plurality of storage devices 30, and is configured to operate in cooperation with the storage access monitoring device 100.

The storage management device 600 has a function to acquire the operation status of each volume 40 of each storage device 30 as the operation information by executing a storage management application 610, and a function to provide the acquired operation information to the storage access monitoring device 100.

In the embodiment described above, the storage access monitoring device 100 acquires the operation information regarding each volume 40 of the storage device 30 from the storage device 30. In the first derivative example, on the other hand, the storage management device 600 acquires the operation information regarding each volume 40 of each storage device 30, and the storage access monitoring device 100 can acquire the operation information regarding each volume 40 of each storage device 30 from the storage management device 600.

According to this configuration, even in a configuration where the plurality of storage devices 30 are provided, the storage management device 600 can centrally manage the operation information of each volume 40 of each storage device 30. The storage access monitoring device 100 can acquire the operation information of each volume 40 of each storage device 30 from the storage management device 600, by cooperating with the storage management device 600, thereby making it possible to acquire the operation information of each volume 40 efficiently and appropriately to detect the abnormal behavior in access to each volume 40 caused by ransomware.

Second Derivative Example

Figure 13:
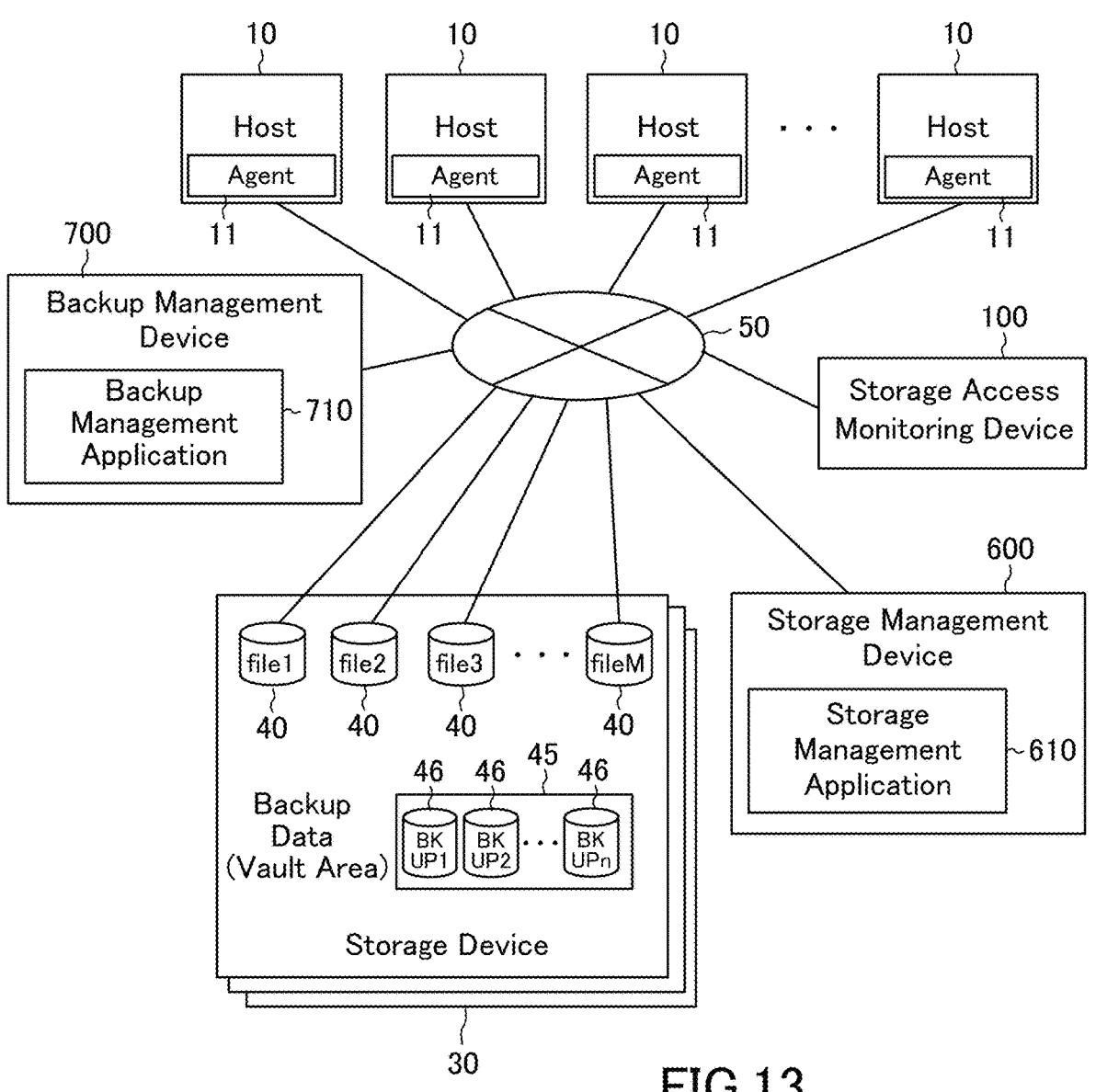
FIG. 13 is a system configuration diagram showing an example of a network system according to a second derivative example of the embodiment of the present invention.

A second derivative example of the present embodiment will be described with reference to FIG. 13. FIG. 13 is a system configuration diagram showing an example of a network system according to the second derivative example of the present embodiment.

The network system shown in FIG. 13 is generally configured by a host 10, a storage device 30, a storage access monitoring device 100, a storage management device 600, and a backup management device 700. The host 10, the storage access monitoring device 100, and the storage management device 600 have the same configuration as the first derivative example described above.

In the second derivative example, there are a plurality of storage devices 30, and each storage device 30 is provided with a plurality of backup volumes 46 in a location (Vault area 45) that is inaccessible from external sources.

The backup management device 700 is a management server that performs the backup management of data stored in each volume 40 of each storage device 30.

The backup management device 700 has a function to store data stored in each volume 40 of each storage device 30 in the backup volume 46 as backup data by executing a backup management application 710. Data backup may be performed periodically, for example, or may be performed immediately every time a data change is made. The backup data is preferably stored over multiple dates and times or generations so that data can be restored to any point in the past.

According to this configuration, the data stored in each volume 40 of each storage device 30 can be stored as backup data. Furthermore, by centrally managing backup process in each storage device 30 using the backup management device 700, backup can be executed reliably, so that the safety provided by backups can be improved.

Further, when the storage access monitoring device 100 detects the abnormal behavior in accessing each volume 40 caused by ransomware, the presence of ransomware can be found at an early stage, so that data can be restored quickly by using the backup data before the detection of the abnormal behavior.

Hardware Configuration

Figure 14:
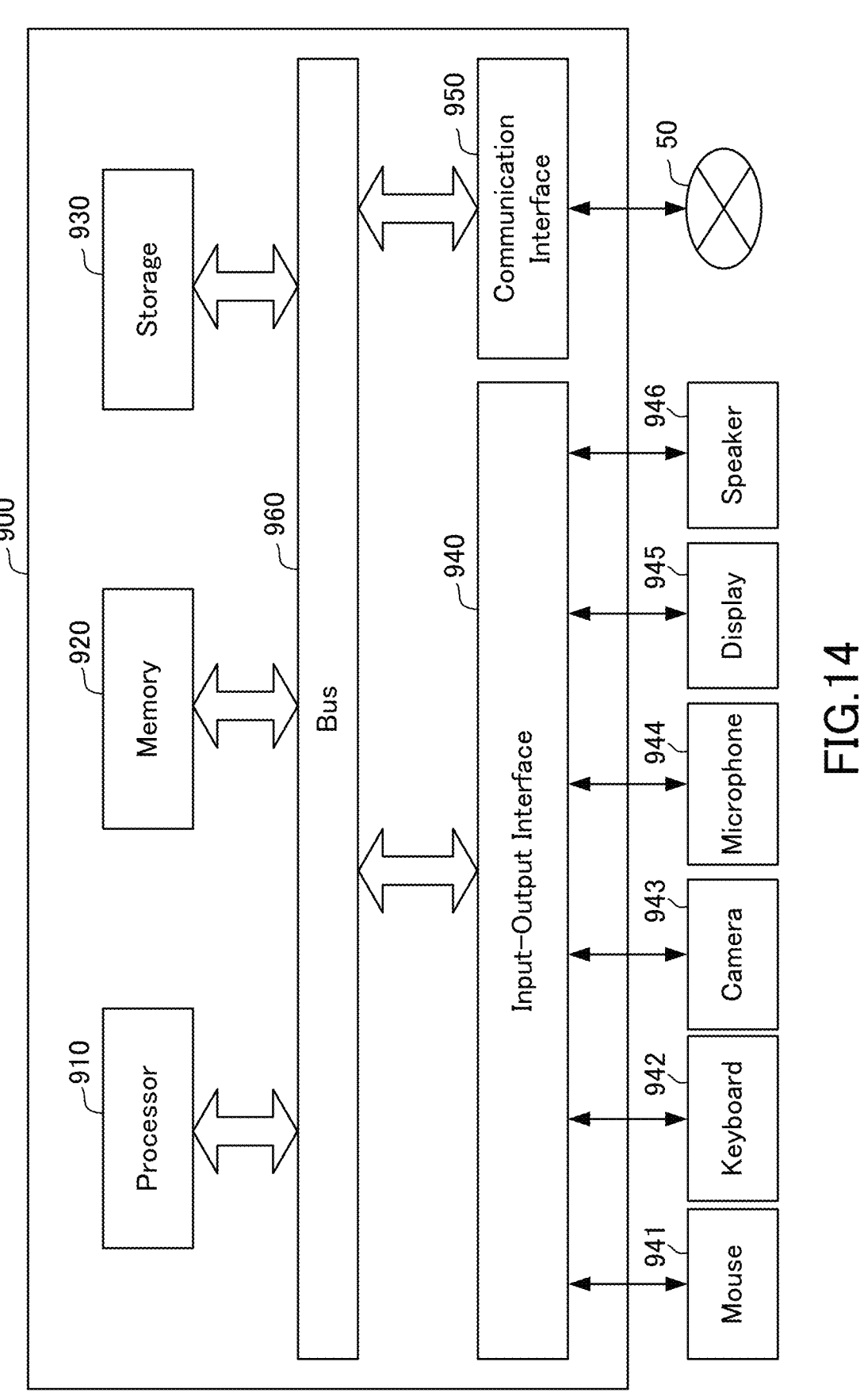
FIG. 14 is a schematic block diagram showing an example of a configuration of a computer capable of performing processing according to the embodiment of the present invention.

The host 10, the storage device 30, the storage access monitoring device 100, the storage management device 600, and the backup management device 700 described above can be realized, for example, by a computer 900 having the hardware configuration described below. FIG. 14 is a schematic block diagram showing an example of a configuration of the computer 900 that can perform processing according to the embodiment of the present invention.

The computer 900 shown in FIG. 14 includes, for example, a processor 910, a memory 920, a storage 930, an input-output interface (input-output I/F) 940, and a communication interface (communication I/F) 950, and respective components are connected through a bus 960. As the computer 900, for example, a general-purpose computer, a mobile communication terminal, or the like can be appropriately selected.

The processor 910 is hardware that executes various instructions written by programs and realizes and controls various functions in the computer 900. The processor 910 may be, for example, a CPU, a DSP (Digital Signal Processor) that performs data processing specialized for a specific purpose, a GPU (Graphics Processing Unit), and the like, or an FPGA (Field Programmable Gate Array) with high design flexibility, and the like.

The memory 920 is constituted by a volatile memory that temporarily stores programs and data executed by the computer 900, and is, for example, a main storage device such as a RAM (Random Access Memory).

The storage 930 includes various types of auxiliary storage devices such as a magnetic disk like an HDD (Hard Disk Drive), a semiconductor memory like an SSD (Solid State Drive), an auxiliary storage device like a magneto-optical disk), and an optical disk. The storage 930 may be connected through the input-output interface 940 and may be located at a location accessible through the communication interface 950. Further, the storage 930 can configure each volume 40 described above.

The storage 930 can store programs that describe processing procedures in the present embodiment as program instructions, along with data. The processor 910 is so configured to read the program according to the present embodiment from the storage 930, deploy it onto the memory 920, and execute the program command, thereby enabling the computer 900 to implement the functions according to the present embodiment. For example, an agent program that runs on the host 10, various programs of the system management application 200 that run on the storage access monitoring device 100, a storage management application 610 that runs on the storage management device 600, and a backup management application 710 that runs on the backup management device 700 are all created in advance as executable programs, so that the processor 910 reads the program from the storage 930, deploys it onto the memory 920, and executes the program instructions, thereby realizing a desired function.

The input-output interface 940 has a function to accept input from the outside and a function to output information to the outside. The input-output interface 940 is configured to be capable of connecting, for example, user input devices such as a mouse 941 and a keyboard 942, information gathering devices such as a camera 943 and a microphone 944, information output devices such as a display 945 and a speaker 946, and the like, as necessary.

The communication interface 950 has a function for the computer 900 to communicate with other computers. The communication interface 950 may be configured so that the computer 900 can access to other computers through a network 50.

The network 50 includes, for example, a LAN (Local Area Network), a WAN (Wide Area Network), the Internet, and the like. Further, the communication interface 950 may be configured to be capable of communicating directly with other computers. The communication method used by the communication interface 950 is not particularly limited, and either a packet communication method or a circuit switching method may be used, and either wired communication or wireless communication may be used.

Effects of the Present Embodiment

Hereinafter, the effects of the present embodiment will be explained.

The storage access monitoring method in the present embodiment is a storage access monitoring method implemented by a computer 900, which has: an operation information acquisition step (step ST1) to acquire, as operation information, the operation status of the volume 40 that constitutes the storage device 30 that allows the host 10 which is an endpoint, to read/write data through the network 50; a ransomware operation determination step (steps ST5 to ST10) to determine whether or not there is a possibility that ransomware is running on the host 10 based on the operation information of the volume 40; and an abnormality report notification step (step ST11) to output an abnormality report when there is a possibility that ransomware is running.

The ransomware operation determination step includes: a comparative analysis step (steps ST5 and ST6) in which the latest operation information and the past operation information are compared to determine that the behavior related to the latest operation information is abnormal; a pattern comparison step (steps ST7 and ST8) in which it is determined whether or not there is a behavioral pattern that indicates a possibility of the effect of the ransomware in the latest operation information to determine that the behavior related to the latest operation information is abnormal; and a trend comparison step (steps ST9 and ST10) in which it is determined whether or not the operation related to the latest operation information is different from the normal operation related to the past operation information to determine that the behavior related to the latest operation information is abnormal.

It is determined that there is a possibility that ransomware is running on the host 10, in the case that the behavior related to the latest operation information is determined to be abnormal in any one or more of the comparative analysis step, the pattern comparison step, and the trend comparison step described above.

According to the above process, it is possible to determine whether or not ransomware is running on the host 10 that uses data stored in the storage device 30 through the network 50 by monitoring the operation status of the volumes 40 that constitute the storage device 30. Therefore, even in the case that virus checking software is not installed on the host 10 which is an endpoint or the virus checking software has not been updated to the latest pattern file, it is possible to grasp the security status of the host 10 and detect ransomware infection. Further, even if there are a large number of hosts 10, the storage access monitoring device 100 can centrally monitor the security status, thereby improving security level and reducing operation costs.

According to the above process, since an abnormal behavior can be detected by monitoring the operation status of the volumes 40 that constitute the storage device 30, it is possible to detect ransomware infection having unknown characteristics that cannot be detected by conventional virus checking software. Further, since the abnormal behavior that may be caused by the effect of ransomware can be found at an early stage, data encryption and data exfiltration by ransomware can be prevented at an early stage. Further, since data recovery can be quickly performed, it is possible to minimize the impact on business operations.

Further, in the above-mentioned storage access monitoring method, the operation information may include the number of sequential reads, the number of sequential writes, the number of random reads, and number of random writes for each logical unit of the volume 40, and the number of sequential reads, the number of sequential writes, the number of random reads, and the number of random writes for each logical block address of the logical unit.

By this, it is possible to determine whether or not ransomware is running on the host 10, by monitoring the number of sequential reads, the number of sequential writes, the number of random reads, and the number of random writes for each logical unit of the volume 40, as well as the number of sequential reads, the number of sequential writes, the number of random reads, and the number of random writes for each logical block address of the logical unit, as the operation status of the volumes 40 that constitute the storage device 30.

Further, the above-mentioned storage access monitoring method may have a ratio calculation step (step ST4) to calculate: the read/write ratio, which is the ratio of the sum of the number of sequential reads and the number of random reads to the sum of the number of sequential writes and the number of random writes; and a sequential/random ratio, which is the ratio of the sum of the number of sequential reads and sequential writes to the sum of the number of random reads and random writes, and the behavior related to the latest operation information is determined to be abnormal in the comparative analysis step in the case of determining that the read/write ratio regarding the latest operation information and the read/write ratio regarding the past operation information are reversed, and, in the case of determining that the sequential/random ratio regarding the latest operation information and the sequential/random ratio regarding the past operation information are reversed.

By this, it is possible to determine that ransomware is running on the host 10 in the case that there occurs a behavior in which the read/write ratio is reversed over time, or there occurs a behavior in which the sequential/random ratio is reversed over time.

Further, the above-mentioned storage access monitoring method includes a file information acquisition step to acquire, as file information, information related to reading/writing of files in the volume 40 by the host 10, and a mapping step (step ST3) to perform mapping between the file information and the logical block address of the logical unit, and the behavior related to the latest operation information is determined to be abnormal in the pattern comparison step in the case of determining that only the header portion of the file has been rewritten.

By this, it is possible to determine that ransomware is running on the host 10 in the case that a behavior such as rewriting only the header portion of the file occurs.

Further, the above-mentioned storage access monitoring method may have a statistics calculation step (step ST4) to calculate a mean value and a standard deviation value regarding the latest operation information and a mean value and a standard deviation value regarding the past operation information, and the behavior related to the latest operation information is determined to be abnormal in the trend comparison step, in the case that of determining that the statistical distribution acquired from the mean value and the standard deviation value regarding the latest operation information deviates beyond the predetermined condition from the statistical distribution acquired from the mean value and the standard deviation value of past operation information.

By this, it is possible to determine that ransomware is running on the host 10 in the case that the operation status of the volume 40 deviates from the normal operation without the effect of ransomware.

In addition, in the above-mentioned storage access monitoring method, the behavior related to the latest operation information is determined to be abnormal in the case that the numerical values of the mean value±standard deviation value regarding the latest operation information fall outside the range determined by the mean value±2×standard deviation value regarding the past operation information.

According to the above process, it is possible to determine that ransomware is running on the host 10 in the case that the mean value and standard deviation value representing the operation status of the volume 40 are calculated and the mean value and the standard deviation value exceed a predetermined condition.

Further, in the above-mentioned storage access monitoring method, it may be determined that there is a possibility that the ransomware is running on the host 10 in the case that the behavior related to the latest operation information is determined to be abnormal in all steps of the comparative analysis step, the pattern comparison step, and the trend comparison step.

According to the above process, since it is determined that ransomware is running on the host 10 when the abnormal behavior is detected in all steps of the comparative analysis step, the pattern comparison step, and the trend comparison step, it is possible to reliably detect the case with a higher possibility of the effect by ransomware and reduce the misdetection (false positive).

Further, in order to achieve the above objective, the storage access monitoring device 100 according to the present invention has: an operation information acquisition unit that acquires, as operation information, the operation status of the volume 40 that constitutes the storage device 30 that allows the host 10 which is an endpoint, to read/write data through the network 50; a ransomware operation determination unit that determines whether or not there is a possibility that the ransomware is running on the host 10 based on the operation information of the volume 40; and an abnormality report notification unit that outputs an abnormality report when there is a possibility that ransomware is running, wherein the ransomware operation determination unit is configured to perform: a comparative analysis process to determine that the behavior related to the latest operation information is abnormal by comparing the latest operation information and the past operation information; a pattern comparison process to determine that the behavior related to the latest operation information is abnormal by determining whether or not there is a behavioral pattern that indicates a possibility of the effect of the ransomware in the latest operation information; and a trend comparison process to determine that the behavior related to the latest operation information is abnormal by determining whether or not the operation related to the latest operation information is different from the normal operation related to the past operation information, and it is determined that there is a possibility that the ransomware is running on the host 10, in the case that that the behavior related to the latest operation information is determined to be abnormal in any one or more of the comparative analysis process, the pattern comparison process, and the trend comparison process.

According to the above configuration, it is possible to determine whether or not ransomware is running on the host 10 that uses data stored in the storage device 30 through the network 50 by monitoring the operation status of the volumes 40 that constitute the storage device 30. Therefore, even in the case that virus checking software is not installed on the host 10 which is an endpoint, or the virus checking software has not been updated to the latest pattern file, it is possible to grasp the security status of the host 10 and detect ransomware infection. Further, even if there are a large number of hosts 10, the storage access monitoring device 100 can centrally monitor the security status, thereby improving security level and reducing operation costs.

According to the above configuration, since an abnormal behavior is detected by monitoring the operation status of the volumes 40 that constitute the storage device 30, it is possible to detect ransomware infection having unknown characteristics that cannot be detected by conventional virus checking software. Further, since the abnormal behavior that may be caused by the effect of ransomware can be found at an early stage, data encryption and data exfiltration by ransomware can be prevented at an early stage. Further, since data recovery can be quickly performed, it is possible to minimize the impact on business operations.

The embodiment described above is described to facilitate understanding of the present invention, and are not intended to limit the present invention. All components and all processing steps disclosed in the embodiment described above are intended to include all design changes and equivalents that fall within the technical scope of the present invention.

26

INDUSTRIAL APPLICABILITY

The present invention enables early detection of ransomware infection of endpoints and prevents data encryption and data exfiltration, even if ransomware countermeasures are not sufficiently implemented on the endpoint, so that the present invention can be applied to various detection technologies.

EXPLANATION OF SYMBOLS

10 Host (Host Device)
11 Agent
30 Storage Device
40 Volume
45 Vault Area
46 Backup Volume
50 Network
100 Storage Access Monitoring Device
110, 910 Processor
120, 950 Communication Interface (Communication I/F)
130, 940 Input-Output Interface (Input-Output I/F)
140, 920 Memory
150 Storage
160, 960 Bus
200 System Management Application
211 Operation Information Acquisition Program
212 Management Table Update Program
213 File Information Acquisition Program
214 Mapping Program
215 Numerical Analysis Program
216 Comparative Analysis Program
217 Pattern Comparison Program
218 Trend Comparison Program
219 Abnormality Report Output Program
300 Management Table
400 By-Logical-Unit Operation Information Management Table
401, 501 "Logical Unit Name" Column
402, 505 "Acquisition Date and Time" Column
410, 510 "Acquired Data" Column
411, 511 "Sequential Read Number" Column
412, 512 "Sequential Write Number" Column
413, 513 "Random Read Number" Column
414, 514 "Random Write Number" Column
420 "Analysis" Column
430 "Sequential Read Statistics" Column
440 "Sequential Write Statistics" Column
450 "Random Read Statistics" Column
460 "Random Write Statistics" Column
431, 441, 451, 461 "Mean Value" Column
432, 442, 452, 462 "Standard Deviation" Column
470 "Read/Write Ratio" Column
480 "Sequential/Random Ratio" Column
500 By-File Operation Information Management Table
502 "File Name" Column
503 "LBA Flag" Column
504 "Block Address" Column
600 Storage Management Device
610 Storage Management Application
700 Backup Management Device
710 Backup Management Application
900 Computer
930 Storage
941 Mouse
942 Keyboard
943 Camera 944 Microphone
945 Display
946 Speaker

What is claimed is:

1. A storage access monitoring method implemented by a computer, the method comprising:
   (a) acquiring, as operation information, an operation status of a volume that constitutes a storage device that allows a host device to read/write data through a network;
   (b) determining whether or not ransomware is running on the host device based on the operation information of the volume; and
   (c) outputting an abnormality report when the ransomware is running,
   wherein (b) comprises:
      (i) determining if a behavior related to latest operation information is abnormal by comparing the latest operation information and past operation information;
      (ii) determining if the behavior related to the latest operation information is abnormal by determining whether or not there is a behavioral pattern that indicates an effect of the ransomware in the latest operation information; and
      (iii) determining if the behavior related to the latest operation information is abnormal by determining whether or not an operation related to the latest operation information is different from an operation related to the past operation information, the past operation information being recorded when no ransomware is running on the host device,
   wherein it is determined that the ransomware is running on the host device, in the case that the behavior related to the latest operation information is determined to be abnormal in any one or more of (i), (ii) or (iii),
   the method further comprising:
   (d) acquiring as file information, information related to reading/writing of files in the volume by the host device;
   (e) performing mapping between the file information and the logical block address of the logical unit, by storing, for each logical block address, a header flag indicating whether the logical block address corresponds to a header portion of a file; and
   (f) detecting that only the header portion of a file has been rewritten by:
      identifying logical block addresses having the header flag,
      detecting a writing operation to the logical block addresses having the header flag, and
      determining an absence of a writing operation to logical block addresses not having the header flag, based on the operation information;
   wherein the behavior related to the latest operation information is determined to be abnormal in (ii) in the case of determining that only a header portion of the file has been rewritten.

2. The storage access monitoring method according to claim 1, wherein
   the operation information includes a number of sequential reads, a number of sequential writes, a number of random reads, and a number of random writes for each logical unit of the volume, and a number of sequential reads, a number of sequential writes, a number of random reads, and a number of random writes for each logical block address of the logical unit.

3. The storage access monitoring method according to claim 2, the method further comprising calculating a read/write ratio that is a ratio of the sum of the number of sequential reads and the number of random reads to the sum of the number of sequential writes and the number of random writes; and a sequential/random ratio that is a ratio of the sum of the number of sequential reads and the number of sequential writes to the sum of the number of random reads and the number of random writes, wherein
   the behavior related to the latest operation information is determined to be abnormal in (i), in the case of determining that the read/write ratio regarding the latest operation information and the read/write ratio regarding the past operation information are reversed and in the case of determining that the sequential/random ratio regarding the latest operation information and the sequential/random ratio regarding the past operation information are reversed.

4. The storage access monitoring method according to claim 2, the method further comprising calculating a mean value and a standard deviation value regarding the latest operation information and a mean value and a standard deviation value regarding the past operation information, wherein
   the behavior related to the latest operation information is determined to be abnormal in (iii), in the case of determining that the statistical distribution acquired from the mean value and the standard deviation value regarding the latest operation information deviates beyond a predetermined condition from the statistical distribution acquired from the mean value and the standard deviation value regarding the past operation information.

5. The storage access monitoring method according to claim 4, wherein
   the behavior related to the latest operation information is determined to be abnormal in the case that numerical values of the mean value±standard deviation value regarding the latest operational information fall outside the range determined by the mean value±2×standard deviation value regarding the past operation information.

6. The storage access monitoring method according to claim 1, wherein
   it is determined that the ransomware is running on the host device in the case that the behavior related to the latest operation information is determined to be abnormal in all of (i), (ii), and (iii).

7. The storage access monitoring method according to claim 1, wherein the file information is provided by an agent program executed on the host device.

8. A storage access monitoring device, the device comprising:
   a memory; and
   a processor connected to the memory,
   the processor comprising:
   an operation information acquisition unit that acquires, as operation information, an operation status of a volume that constitutes a storage device that allows a host device to read/write data through a network;
   a ransomware operation determination unit that determines whether or not ransomware is running on the host device based on the operation information of the volume; and
   an abnormality report notification unit that outputs an abnormality report when ransomware is running, wherein the ransomware operation determination unit is configured to perform:

a comparative analysis process to determine that a behavior related to latest operation information is abnormal by comparing the latest operation information and past operation information;

a pattern comparison process to determine that the behavior related to the latest operation information is abnormal by determining whether or not there is a behavioral pattern that indicates an effect of the ransomware in the latest operation information; and a trend comparison process to determine that the behavior related to the latest operation information is abnormal by determining whether or not an operation related to the latest operation information is different from an operation related to the past operation information, the past operation information being recorded when no ransomware is running on the host device, wherein it is determined that the ransomware is running on the host device, in the case that the behavior related to the latest operation information is determined to be abnormal in any one or more of the comparative analysis process, the pattern comparison process, and the trend comparison process, the ransomware operation determination unit is further configured to perform:

a file information acquisition process to acquire, as file information, information related to reading/writing of files in the volume by the host device;

a mapping process to perform mapping between the file information and the logical block address of the logical unit by storing, for each logical block address, a header flag indicating whether the logical block address corresponds to a header portion of a file; and a detection process to detect that only the header portion of a file has been rewritten by:

identifying logical block addresses having the header flag, detecting a writing operation to the logical block addresses having the header flag, and determining an absence of a writing operation to logical block addresses not having the header flag, based on the operation information;

wherein the behavior related to the latest operation information is determined to be abnormal in the pattern comparison step in the case of determining that only a header portion of the file has been rewritten.

9. The storage access monitoring device according to claim 8, wherein the file information is provided by an agent program executed on the host device.

*  *  *  *  *